(12) United States Patent
Miyagawa

(10) Patent No.: US 9,249,720 B2
(45) Date of Patent: Feb. 2, 2016

(54) AMMONIA FUELED INTERNAL COMBUSTION ENGINE WITH EXHAUST PURIFICATION

(71) Applicant: KABUSHIKI KAISHA TOYOTA CHUO KENKYUSHO, Nagakute-shi, Aichi-ken (JP)

(72) Inventor: Hiroshi Miyagawa, Nagakute (JP)

(73) Assignee: KABUSHIKI KAISHA TOYOTA CHUO KENKYUSHO, Nagakute-shi (JP)

( * ) Notice: Subject to any disclaimer, the term of this patent is extended or adjusted under 35 U.S.C. 154(b) by 91 days.

(21) Appl. No.: 13/866,305

(22) Filed: Apr. 19, 2013

(65) Prior Publication Data

US 2014/0311428 A1    Oct. 23, 2014

(51) Int. Cl.
| | |
|---|---|
| *F02B 43/10* | (2006.01) |
| *F02M 25/022* | (2006.01) |
| *F02D 41/14* | (2006.01) |
| *F02D 41/00* | (2006.01) |
| *F01N 3/10* | (2006.01) |

(Continued)

(52) U.S. Cl.
CPC .............. *F02B 43/10* (2013.01); *F01N 3/106* (2013.01); *F01N 3/2026* (2013.01); *F01N 3/2066* (2013.01); *F02D 41/0025* (2013.01); *F02D 41/1461* (2013.01); *F02M 25/022* (2013.01); *F02M 25/10* (2013.01); *F02D 2041/1468* (2013.01); *Y02T 10/24* (2013.01); *Y02T 10/26* (2013.01)

(58) Field of Classification Search
CPC ...... F02B 43/10; F02M 25/10; F02M 25/022; F02D 41/1461; F02D 41/0025; F02D 2041/1468; F01N 3/106; F01N 3/2026; F01N 3/2066
USPC .......................................... 123/1 A, 1 R, 2, 3
See application file for complete search history.

(56) References Cited

U.S. PATENT DOCUMENTS

| | | | | |
|---|---|---|---|---|
| 6,845,619 | B2 * | 1/2005 | Olander | 60/649 |
| 7,559,195 | B2 * | 7/2009 | Riegger et al. | 60/286 |
| 8,240,277 | B1 * | 8/2012 | Michikawauchi et al. | 123/1 A |

(Continued)

FOREIGN PATENT DOCUMENTS

JP          A-5-332152          12/1993

*Primary Examiner* — Lindsay Low
*Assistant Examiner* — Grant Moubry
(74) *Attorney, Agent, or Firm* — Oliff PLC

(57) ABSTRACT

The internal combustion engine has an ammonia feeder which feeds ammonia to a combustion chamber and an $NO_X$ selective reduction catalyst which is arranged in an engine exhaust passage. The removal rate of the $NO_X$ selective reduction catalyst depends on a ratio of concentration of ammonia to $NO_X$ of the exhaust which flows into the $NO_X$ selective reduction catalyst, that is, a ratio of concentration of inflow. A high removal rate range where the $NO_X$ removal rate in the $NO_X$ selective reduction catalyst becomes substantially maximum and, furthermore, the ammonia removal rate becomes substantially maximum, is set in advance. The internal combustion engine is controlled so that the ratio of concentration of inflow becomes inside the high removal rate range.

12 Claims, 8 Drawing Sheets

(51) Int. Cl.
*F01N 3/20* (2006.01)
*F02M 25/10* (2006.01)

(56) References Cited

U.S. PATENT DOCUMENTS

| | | | |
|---|---|---|---|
| 8,448,423 B2* | 5/2013 | Najt et al. | 60/285 |
| 8,464,515 B2* | 6/2013 | Aso et al. | 60/285 |
| 8,534,237 B2* | 9/2013 | Iwatani et al. | 123/1 A |
| 8,561,578 B2* | 10/2013 | Miyagawa et al. | 123/3 |
| 2007/0204595 A1* | 9/2007 | Hanaoka et al. | 60/274 |
| 2010/0186391 A1* | 7/2010 | Najt et al. | 60/295 |
| 2011/0011354 A1* | 1/2011 | Dincer et al. | 123/3 |
| 2011/0259290 A1* | 10/2011 | Michikawauchi et al. | 123/1 A |
| 2011/0265455 A1* | 11/2011 | Hirota et al. | 60/285 |

* cited by examiner

AMMONIA FUELED INTERNAL COMBUSTION ENGINE WITH EXHAUST PURIFICATION

BACKGROUND OF THE INVENTION

1. Field of the Invention

The present invention relates to an internal combustion engine.

2. Description of the Related Art

An internal combustion engine obtains power by burning fuel in a combustion chamber. An "internal combustion engine" includes engines mounted in automobiles and gas turbine engines. In addition to internal combustion engines fueled by gasoline and other fossil fuels, internal combustion engines fueled by ammonia are known. In internal combustion engines fueled by gasoline etc., when burning the fuel, carbon dioxide is produced, but in internal combustion engines fueled by ammonia, even if burning the fuel, the production of carbon dioxide can be avoided.

Japanese Patent Publication (A) No. 5-332152 discloses an ammonia burning engine, able to burn ammonia gas to obtain a drive force, which is provided with an ammonia cracking reactor which uses the exhaust gas of the combustion chambers to crack the ammonia. The exhaust gas from the combustion chambers is used to heat a heat exchange pipe in the ammonia cracking reactor. It is disclosed that the ammonia gas which is led into the heat exchange pipe is cracked into hydrogen and nitrogen by an endothermic reaction which absorbs the heat of the exhaust gas. Further, the above publication discloses to lead the cracked hydrogen into a combustion chamber or a sub combustion chamber communicated with the combustion chamber. It discloses to use hydrogen gas with its excellent ignitability to make the ammonia gas effectively burn in the combustion chamber or sub combustion chamber and improve the combustibility of the difficult-to-burn ammonia gas.

In an internal combustion engine fueled by ammonia, by burning the fuel in the combustion chambers, nitrogen oxides ($NO_X$) are produced. The exhaust which flows out from the combustion chambers contains not only unburned fuel, but also $NO_X$. In an exhaust purification system of an internal combustion engine, by arranging a device able to reduce $NO_X$ in the engine exhaust passage, it is possible to remove the $NO_X$ which is contained in the exhaust.

For example, by arranging a three-way catalyst in the engine exhaust passage, it is possible to remove the $NO_X$ which is contained in the exhaust. When arranging a three-way catalyst in the engine exhaust passage, to improve the removal rate, it is preferable to perform control so that the air-fuel ratio at the time of combustion becomes the stoichiometric air-fuel ratio. However, precise control becomes necessary for maintaining the air-fuel ratio at the time of combustion at the stoichiometric air-fuel ratio.

On the other hand, to improve the heat efficiency of the internal combustion engine or reduce the amount of fuel consumption, it is preferable to operate the engine so that the air-fuel ratio at the time of combustion becomes lean. That is, it is preferable to perform lean combustion which burns the fuel in an air-rich state. However, when arranging a three-way catalyst in the engine exhaust passage of an internal combustion engine where the air-fuel ratio at the time of combustion becomes lean, the problem arises that the $NO_X$ removal rate becomes lower. Further, when using a three-way catalyst, platinum, palladium, and other expensive precious metals become necessary.

SUMMARY OF THE INVENTION

The present invention has as its object the provision of an internal combustion engine which uses fuel containing ammonia and which is provided with an exhaust purification system which is excellent in performance in purification of exhaust.

A first internal combustion engine of the present invention is provided with an ammonia feeder which feeds ammonia to a combustion chamber and an $NO_X$ selective reduction catalyst which is arranged in an engine exhaust passage and which selectively reduces $NO_X$ by the feed of a reducing agent comprised of ammonia. In the $NO_X$ selective reduction catalyst, the $NO_X$ removal rate and ammonia removal rate are dependent on the ratio of concentration of ammonia to $NO_X$ of the exhaust which flows into the $NO_X$ selective reduction catalyst, defined as the ratio of concentration of inflow. A high removal rate range of the ratio of concentration of inflow where the $NO_X$ removal rate in the $NO_X$ selective reduction catalyst becomes substantially maximum and, furthermore, the ammonia removal rate becomes substantially maximum is set in advance. The internal combustion engine estimates the ratio of concentration of inflow and controls the ratio of concentration of inflow so that the ratio of concentration of inflow is maintained inside the high removal rate range.

In the above-mentioned invention, when making the ratio of concentration of inflow rise, the ignition timing may be advanced, while when making the ratio of concentration of inflow fall, the ignition timing may be retarded.

In the above-mentioned invention, the engine may be provided with a cracker which includes a catalyst which cracks ammonia to produce hydrogen and a hydrogen feeder which feeds the hydrogen which was produced at the cracker to the combustion chambers, when making the ratio of concentration of inflow rise, the ratio of hydrogen to ammonia which are fed to the combustion chambers may be maintained constant while making the air-fuel ratio at the time of combustion fall, and, when making the ratio of concentration of inflow fall, the ratio of hydrogen to ammonia which are fed to the combustion chambers may be maintained constant while making the air-fuel ratio at the time of combustion rise.

In the above-mentioned invention, the engine may be provided with a cracker which includes a catalyst which cracks ammonia to produce hydrogen and a hydrogen feeder which feeds the hydrogen which was produced at the cracker to the combustion chambers, when making the ratio of concentration of inflow rise, the ratio of hydrogen to ammonia which are fed to the combustion chambers may be made to fall, and, when making the ratio of concentration of inflow fall, the ratio of hydrogen to ammonia which are fed to the combustion chambers may be made to rise.

In the above-mentioned invention, the engine may be provided with an air feeder which feeds air to the cracker, the catalyst of the cracker may have the function of oxidizing ammonia and may be formed so that ammonia and air are fed so that the ammonia is cracked and hydrogen is produced and so that ammonia is oxidized and the heat required for the cracking reaction is produced, and, when changing the ratio of hydrogen to ammonia which are fed to the combustion chambers, the ratio of air to ammonia which are fed to the cracker may be made to change.

In the above-mentioned invention, at least one of the $NO_X$ concentration and ammonia concentration of the exhaust which flows out from the $NO_X$ selective reduction catalyst may be detected and the detected at least one concentration of the $NO_X$ concentration and ammonia concentration may be used as the basis to estimate the ratio of concentration of inflow.

A second internal combustion engine of the present invention is provided with an ammonia feeder which feeds ammonia to combustion chambers and an $NO_X$ selective reduction catalyst which is arranged in an engine exhaust passage and which selectively reduces $NO_X$ by the feed of a reducing agent comprised of ammonia. The $NO_X$ selective reduction catalyst has the ability to adsorb ammonia. The $NO_X$ removal rate and ammonia removal rate are dependent on the ratio of concentration of ammonia to $NO_X$ of the exhaust which flows into the $NO_X$ selective reduction catalyst, defined as the ratio of concentration of inflow. A ratio of concentration of inflow when removing all of the $NO_X$ which flows into the $NO_X$ selective reduction catalyst, defined as a reference ratio of concentration, is set in advance. Control where the ratio of concentration of inflow is maintained in a range larger than the reference ratio of concentration and control where the ratio of concentration of inflow is maintained in a range smaller than the reference ratio of concentration are repeatedly performed.

In the above-mentioned invention, a high removal rate range of the ratio of concentration of inflow where the $NO_X$ removal rate in the $NO_X$ selective reduction catalyst becomes substantially maximum and, furthermore, where the ammonia removal rate becomes substantially maximum may be set in advance, the control for maintaining the ratio in the range larger than the reference ratio of concentration may include control for maintaining the ratio of concentration of inflow at a ratio of concentration higher than the high removal rate range, and the control for maintaining the ratio in the range smaller than the reference ratio of concentration may include control for maintaining the ratio of concentration of inflow at a ratio of concentration lower than the high removal rate range.

In the above-mentioned invention, the amount of adsorption of ammonia at the $NO_X$ selective reduction catalyst may be estimated, when the estimated amount of adsorption of ammonia is less than a predetermined lower limit judgment value, control may be performed to maintain the ratio of concentration of ammonia to $NO_X$ in a range larger than the reference ratio of concentration, and, when the estimated amount of adsorption of ammonia is larger than a predetermined upper limit judgment value, control may be performed to maintain the ratio of concentration of ammonia to $NO_X$ in a range smaller than the reference ratio of concentration.

In the above-mentioned invention, when making the ratio of concentration of inflow rise, the ignition timing may be advanced, while when making the ratio of concentration of inflow fall, the ignition timing may be retarded.

In the above-mentioned invention, the engine may be provided with a cracker which includes a catalyst which cracks ammonia to produce hydrogen and a hydrogen feeder which feeds the hydrogen which was produced at the cracker to the combustion chambers, when making the ratio of concentration of inflow rise, the ratio of hydrogen to ammonia which are fed to the combustion chambers may be maintained constant while making the air-fuel ratio at the time of combustion fall, and, when making the ratio of concentration of inflow fall, the ratio of hydrogen to ammonia which are fed to the combustion chambers may be maintained constant while making the air-fuel ratio at the time of combustion rise.

In the above-mentioned invention, the engine may be provided with a cracker which includes a catalyst which cracks ammonia to produce hydrogen and a hydrogen feeder which feeds the hydrogen which was produced at the cracker to the combustion chambers, when making the ratio of concentration of inflow rise, the ratio of hydrogen to ammonia which are fed to the combustion chambers may be made to fall, and, when making the ratio of concentration of inflow fall, the ratio of hydrogen to ammonia which are fed to the combustion chambers may be made to rise.

In the above-mentioned invention, the engine may be provided with an air feeder which feeds air to the cracker, the catalyst of the cracker may have the function of oxidizing ammonia and may be formed so that ammonia and air are fed so that the ammonia is cracked and hydrogen is produced and so that ammonia is oxidized and the heat required for the cracking reaction is produced, and, when changing the ratio of hydrogen to ammonia which are fed to the combustion chambers, the ratio of air to ammonia which are fed to the cracker may be made to change.

In the above-mentioned invention, at least one of the $NO_X$ concentration and ammonia concentration of the exhaust which flows out from the $NO_X$ selective reduction catalyst may be detected and the detected at least one concentration of the $NO_X$ concentration and ammonia concentration may be used as the basis to estimate the ratio of concentration of inflow.

According to the present invention, it is possible therefore to provide an internal combustion engine which uses fuel containing ammonia and which is provided with an exhaust purification system which is excellent in exhaust purification performance.

BRIEF DESCRIPTION OF THE DRAWINGS

These and other objects and features of the present invention will become clearer from the following description of the preferred embodiments given with reference to the attached drawings, wherein.

DESCRIPTION OF THE PREFERRED EMBODIMENTS

Embodiment 1

Referring to FIG. 1 to FIG. 7, an internal combustion engine according to an Embodiment 1 will be explained. In the embodiment, an internal combustion engine arranged in an automobile will be explained as an example. The internal combustion engine in the present embodiment uses ammonia and hydrogen as fuel. The internal combustion engine in the present embodiment includes a hydrogen generator which generates hydrogen from a material comprised of liquid ammonia. The internal combustion engine in the present embodiment supplies heat to the liquid ammonia to make it vaporize and thereby generates gaseous ammonia. Further, it cracks the gaseous ammonia by the cracking catalyst to generate hydrogen.

Figure 1:
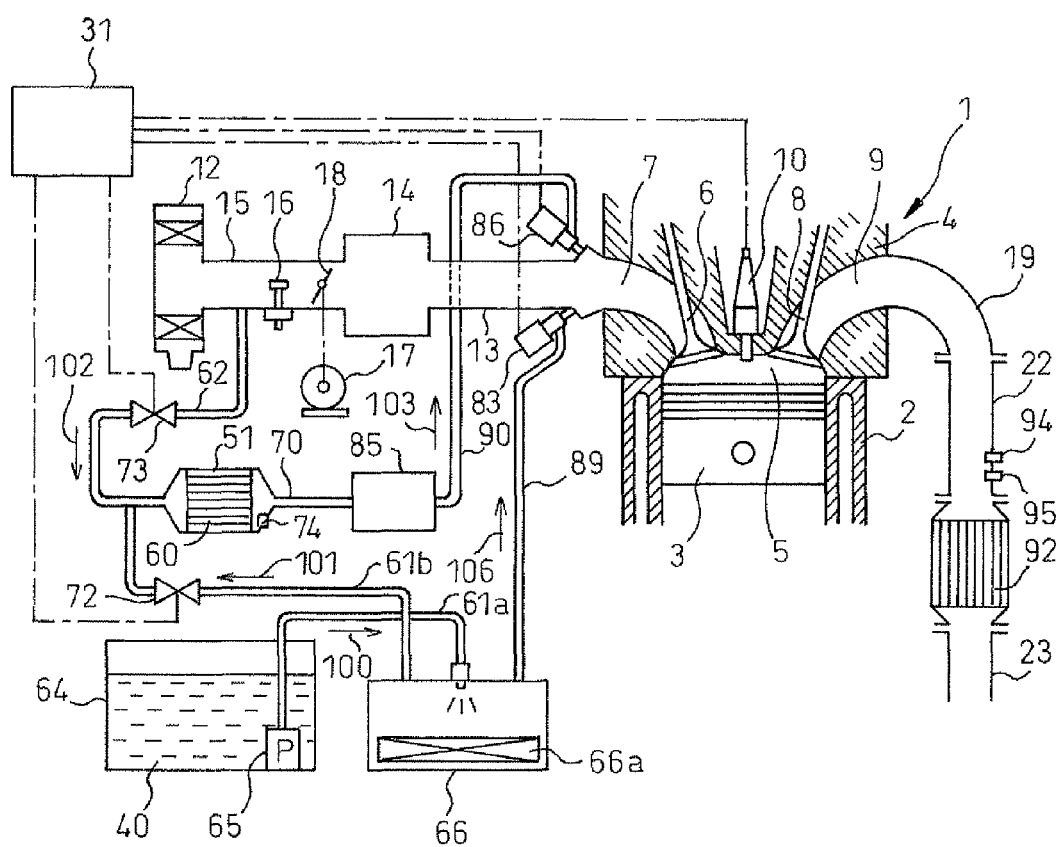
FIG. 1 is a schematic view of an internal combustion engine in an Embodiment 1.

FIG. 1 is a schematic view of the internal combustion engine in the present embodiment. The internal combustion engine in the present embodiment is a spark ignition type. The internal combustion engine is provided with an engine body 1. The engine body 1 includes a cylinder block 2 and a cylinder head 4. Inside the cylinder block 2, pistons 3 are arranged. Combustion chambers 5 are formed by the spaces between the top surfaces of the pistons 3 and the cylinder head 4. The combustion chambers 5 are formed corresponding to the cylinders.

Each combustion chamber 5 is connected to an engine intake passage and engine exhaust passage. The cylinder head 4 is formed with intake ports 7 and exhaust ports 9. An intake valve 6 is formed so as to be able to open and close the engine intake passage communicated with each combustion chamber 5. An exhaust valve 8 is formed so as to be able to open and close the engine exhaust passage communicated with each combustion chamber 5. At the cylinder head 4, spark plugs 10 are attached as ignition devices. The spark plugs 10 are formed so as to ignite the fuel in the combustion chambers 5. The spark plugs 10 in the present embodiment are plasma jet spark plugs.

The intake port 7 of each cylinder is connected through a corresponding intake runner 13 to a surge tank 14. The surge tank 14 is connected through an intake duct 15 to an air cleaner 12. In the intake duct 15, an air flowmeter 16 is arranged for detecting the amount of intake air. Inside the intake duct 15, a throttle valve 18 driven by the step motor 17 is arranged.

The internal combustion engine in the present embodiment is provided with an exhaust purification system for purifying the exhaust gas. The exhaust port 9 of each cylinder is connected to a corresponding exhaust manifold 19. The exhaust manifold 19 is connected to an exhaust pipe 22. The exhaust purification system in the present embodiment includes an $NO_X$ selective reduction catalyst (SCR). The $NO_X$ selective reduction catalyst 92 is connected to the exhaust pipe 22. The $NO_X$ selective reduction catalyst 92 has an exhaust pipe 23 connected to it. The exhaust which flows out from the $NO_X$ selective reduction catalyst 92 passes through the exhaust pipe 23 and is released into the atmosphere.

In the engine exhaust passage upstream from the $NO_X$ selective reduction catalyst 92, an $NO_X$ sensor 94 is arranged which detects the $NO_X$ concentration of the exhaust which flows into the $NO_X$ selective reduction catalyst 92. Further, in the engine exhaust passage upstream from the $NO_X$ selective reduction catalyst 92, an ammonia sensor 95 is arranged which detects the ammonia concentration of the exhaust which flows into the $NO_X$ selective reduction catalyst 92. The signal of the $NO_X$ concentration which is detected by the $NO_X$ sensor 94 and the signal of the ammonia concentration which is detected by the ammonia sensor 95 are input to a controller 31.

The hydrogen generator in the present embodiment is provided with a cracker 51 for cracking ammonia. The cracker 51 in the present embodiment includes a cracking catalyst for cracking ammonia and an oxidation catalyst for oxidizing ammonia. The cracking catalyst includes catalyst particles for cracking ammonia, while the oxidation catalyst includes catalyst particles for oxidizing ammonia. The cracker 51 of the present embodiment includes the catalyst 60. The catalyst 60 in the present embodiment is comprised of the cracking catalyst and the oxidation catalyst formed integrally.

The catalyst 60 in the present example is formed as a honeycomb structure. The catalyst 60 includes a substrate in which a plurality of flow paths are formed. The substrate is, for example, formed by cordierite or a metal. On the surfaces of the flow paths of the substrate, coated layers are formed. At the coated layers, particle-like carriers carrying catalyst particles are arranged.

The catalyst 60 in the present embodiment is comprised of a single substrate on which catalyst particles for oxidizing ammonia and catalyst particles for cracking ammonia are arranged. In the present embodiment, the catalyst particles for oxidizing the ammonia and the catalyst particles for cracking the ammonia are carried on a carrier. The carrier is formed by for example aluminum oxide. As the metal of the catalyst particles for oxidizing the ammonia, platinum and other precious metals or iron or other base metals may be mentioned. The catalyst particles for oxidizing the ammonia are not limited to this. They may be formed from any metal promoting the oxidation of ammonia.

As the metal of the catalyst particles for cracking the ammonia, ruthenium or another precious metal or nickel or cobalt or another base metal may be illustrated. In the present example, ruthenium is employed. The catalyst particles for cracking the ammonia are not limited to this mode and can be formed by any metal promoting the cracking of ammonia.

The hydrogen generator in the present embodiment is formed so as to heat the catalyst 60 by a heater. The heater in the present embodiment includes an electric heater arranged around the catalyst 60. At the time of startup of the internal combustion engine, the electric heater may be powered to raise the temperature of the catalyst 60.

In this embodiment, downstream of the catalyst 60 of the cracker 51, a temperature sensor 74 is arranged for detecting the temperature of the catalyst 60. The signal of the temperature detected by the temperature sensor 74 is input to the controller 31.

The hydrogen generator in the present embodiment vaporizes the material ammonia 40 and feeds it to the cracker 51. The hydrogen generator includes a tank 64 for storing the ammonia. The tank 64 is pressurized inside it and stores liquid ammonia 40. The hydrogen generator in the present embodiment includes a pump 65 for supplying liquid ammonia 40. The pump 65 is connected to an ammonia feed pipe 61a.

The hydrogen generator includes an evaporator 66 which is connected to the ammonia feed pipe 61a. The evaporator 66 is formed so that the liquid ammonia can be heated. The evaporator 66 has the ammonia feed pipe 61b which feeds gaseous ammonia connected to it. The ammonia feed pipe 61b is connected to the inflow pipe 62 so as to discharge the gaseous ammonia to the inside of the inflow pipe 62.

The evaporator 66 in the present embodiment uses the heat exchange of the liquid ammonia and engine cooling water to vaporize the liquid ammonia. The evaporator 66 has a heat exchanger 66a. In the heat exchanger 66a of the present embodiment, engine cooling water of the engine body 1 is supplied. At the heat exchanger 66a, heat exchange is performed between the liquid ammonia and the engine cooling water.

The cracker 51 has an air feeder connected to it for feeding air. The air feeder in the present embodiment includes an inflow pipe 62 which is connected to the cracker 51. The inflow pipe 62 is connected upstream of the throttle valve 18 to the engine intake passage. In the present embodiment, the gas which flows out from the cracker 51 is injected from the hydrogen injector 86 due to the intake runners 13 becoming a negative pressure during the operating period. The cracker 51 is fed with air and ammonia. The air feeder is not limited to this and need only be formed so as to be able to feed air to the catalyst 60.

The outflow pipe 70 which is connected to the cracker 51 is connected to a cooler 85. The cooler 85 is formed so as to cool the high temperature gas which flows out from the cracker 51. The engine cooling water flows into the cooler 85 in the present embodiment. The gas which flows out from the cracker 51 is cooled by the engine cooling water.

In the middle of the ammonia feed pipe 61b, a flow regulator 72 is arranged for regulating the flow of gaseous ammonia fed to the catalyst 60. Further, in the middle of the inflow pipe 62, a flow regulator 73 is arranged for regulating the flow of air fed to the catalyst 60. The flow regulator 73 is arranged in the inflow pipe 62 at the upstream side from the position where the ammonia feed pipe 61b is connected.

The internal combustion engine in the present embodiment is provided with a hydrogen feeder which feeds hydrogen generated by the cracker 51 to the combustion chambers 5. The hydrogen feeder includes a hydrogen injector 86 which injects hydrogen toward the inside of the engine intake passage. The hydrogen injector 86 is connected through the feed pipe 90 to the cooler 85. The hydrogen which was generated at the cracker 51, as shown by the arrow 103, is fed through the outflow pipe 70, cooler 85, and feed pipe 90 to the hydrogen injector 86.

The internal combustion engine in the present embodiment is provided with an ammonia feeder which feeds ammonia to the combustion chambers 5. The ammonia feeder in the present embodiment includes an ammonia injector 83 which injects ammonia toward the inside of the engine intake passage. The ammonia injector 83 is connected through the feed pipe 89 to the evaporator 66 of the hydrogen generator. Part of the ammonia which was generated at the evaporator 66, as shown by the arrow 106, is fed through the feed pipe 89 to the ammonia injector 83. Further, the ammonia feeder in the present embodiment feeds the ammonia not cracked by the catalyst 60 to the combustion chambers 5. The ammonia which could not be cracked by the catalyst 60 is fed through the hydrogen injector 86 to the combustion chambers 5.

Note that, the hydrogen injector 86 and ammonia injector 83 in the present embodiment are formed so as to inject fuel to the engine intake passage, but the invention is not limited to this. These injectors may also be formed so as to feed fuel into the combustion chambers 5. For example, these injectors may be arranged to directly inject fuel to the combustion chambers 5.

The internal combustion engine in the present embodiment is provided with a controller 31. The controller 31 in the present embodiment includes a digital computer. The controller 31 receives as input the output of the air flow meter 16 and signals etc. of the temperature sensor included in the hydrogen generator. The controller 31 controls the step motor 17 driving the throttle valve 18. Further, the controller 31 controls the hydrogen injector 86, ammonia injector 83, and spark plugs 10. The controller 31 controls the pump 65 and flow regulators 72 and 73. In this way, the controller 31 controls the devices included in the engine body and the hydrogen generator.

The hydrogen generator in the present embodiment uses the electric heater to raise the temperature of the catalyst 60 at the time of startup. The controller 31 drives the pump 65 and sets the flow regulator 72 to the open state. The liquid ammonia 40, as shown by the arrow 100, is fed to the evaporator 66. In the evaporator 66, the liquid ammonia 40 changes to a gas. The now gaseous ammonia passes through the ammonia feed pipe 61b and is fed inside the inflow pipe 62 such as shown by the arrow 101.

On the other hand, the controller 31 opens the flow regulator 73, whereby, as shown by the arrow 102, air flows in toward the catalyst 60. In this way, the hydrogen generator in the present embodiment feeds air to the catalyst 60 in addition to the ammonia.

The gas which flows into the catalyst 60 includes air, so part of the ammonia which is fed is oxidized by the action of the oxidation catalyst of the catalyst 60. The ammonia undergoes an oxidation reaction as shown by the following formula.

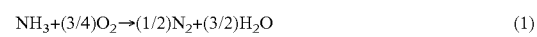

$$NH_3 + (3/4)O_2 \rightarrow (1/2)N_2 + (3/2)H_2O \qquad (1)$$

The oxidation of ammonia is an exothermic reaction. For this reason, the catalyst 60 is heated. The ammonia which could not be used for the oxidation reaction undergoes a cracking reaction due to the cracking catalyst of the catalyst 60. The ammonia is reformed to nitrogen and hydrogen. The cracking reaction of ammonia occurs as shown in the following formula:

$$NH_3 \rightarrow (1/2)N_2 + (3/2)H_2 \qquad (2)$$

The ammonia cracking reaction occurs at a predetermined temperature or more. Further, the ammonia cracking reaction is an endothermic reaction. In the hydrogen generator of the present embodiment, the catalyst 60 can oxidize part of the ammonia and use the heat of oxidation to crack the ammonia. The cracked gas which flows out from the cracking catalyst 60 contains hydrogen and nitrogen and also water vapor. The generated cracked gas, as shown by the arrow 103, flows out from the outflow pipe 70.

The hydrogen generator in the present embodiment is provided with a device for regulating the flow of ammonia fed to the catalyst 60 and a device for regulating the flow of air fed to the catalyst 60. The hydrogen generator in the present embodiment is provided with a flow regulator for regulating the ratio of the flow of air to the flow of ammonia fed to the catalyst 60.

The hydrogen generator in the present embodiment continuously cracks the ammonia. During its operating period, the electrification of the electric heater is stopped. The heat of oxidation at the catalyst 60 can be used for cracking the ammonia. The cracker 51 can crack the ammonia without supplying heat from the outside.

In this embodiment, the hydrogen generated at the cracker 51 of the hydrogen generator is injected by the hydrogen injector 86 to the inside of the intake runners 13. Part of the gaseous ammonia which is formed at the evaporator 66 of the hydrogen generator is injected from the ammonia injector 83 into the intake runners 13. The mixture of the hydrogen and ammonia passes through the intake ports 7 and is fed to the combustion chambers 5. At the combustion chambers 5, the fuel burns and exhaust is generated.

The amount of feed of the ammonia and the amount of feed of the hydrogen at the time of ordinary operation of the internal combustion engine in the present embodiment can, for example, be determined based on the speed and required load of the internal combustion engine. A map of the amounts of feed of the different fuels having the speed and required load of the internal combustion engine as functions is prepared in advance. This map can be stored in the controller 31.

In this embodiment, the required load is detected from the amount of depression of the accelerator pedal and the engine speed is detected by the output etc. of the crank angle sensor.

Using the map stored in the controller 31, it is possible to set the amount of feed of ammonia and the amount of feed of hydrogen. The controller 31 can control the ammonia injector 83 and hydrogen injector 86 based on the set amount of feed of the ammonia and amount of feed of the hydrogen.

The ammonia concentration and hydrogen concentration of the gas which flows out from the catalyst 60 can for example by detected by arranging sensors for detecting these concentrations at the outlet of the catalyst 60. Alternatively, the temperature of the catalyst 60 and the amount of air and the amount of ammonia which are fed to the catalyst 60 may be used as the basis to estimate the ammonia concentration and hydrogen concentration of the cracked gas which flows out from the catalyst 60 by the map etc.

The $NO_X$ selective reduction catalyst which is arranged in the engine exhaust passage is a device which can selectively reduce $NO_X$ by the feed of a reducing agent. The $NO_X$ selective reduction catalyst in the present embodiment uses ammonia as a reducing agent to reduce $NO_X$. The $NO_X$ selective reduction catalyst 92 in the present embodiment contains zeolite which carries iron by ion exchange.

The internal combustion engine in the present embodiment is formed so as to perform combustion by an air-fuel mixture which is leaner than the stoichiometric air-fuel ratio. That is, it performs lean combustion so that the air-fuel ratio at the time of combustion becomes lean. The exhaust gas which flows out from the combustion chambers contains oxygen. The $NO_X$ selective reduction catalyst can reduce the $NO_X$ to nitrogen in the presence of oxygen by using ammonia as a reducing agent. $NO_X$ includes nitrogen monoxide and nitrogen dioxide. The amount of ammonia which is required in a reducing reaction is 1 to 1 by molar ratio with respect to $NO_X$. When the $NO_X$ selective reduction catalyst is reducing $NO_X$, the oxygen which is contained in the exhaust is used to simultaneously oxidize the ammonia. For this reason, the ratio of the ammonia to $NO_X$ of the exhaust which flows into the $NO_X$ selective reduction catalyst is preferably controlled to become larger than 1.

The $NO_X$ removal rate and ammonia removal rate in the $NO_X$ selective reduction catalyst are dependent on the ratio of concentration of ammonia to $NO_X$ of the exhaust which flow into the $NO_X$ selective reduction catalyst. In the present invention, the ratio of concentration of ammonia to $NO_X$ of the exhaust which flows into the $NO_X$ selective reduction catalyst is called the "ratio of concentration of inflow".

Figure 2:
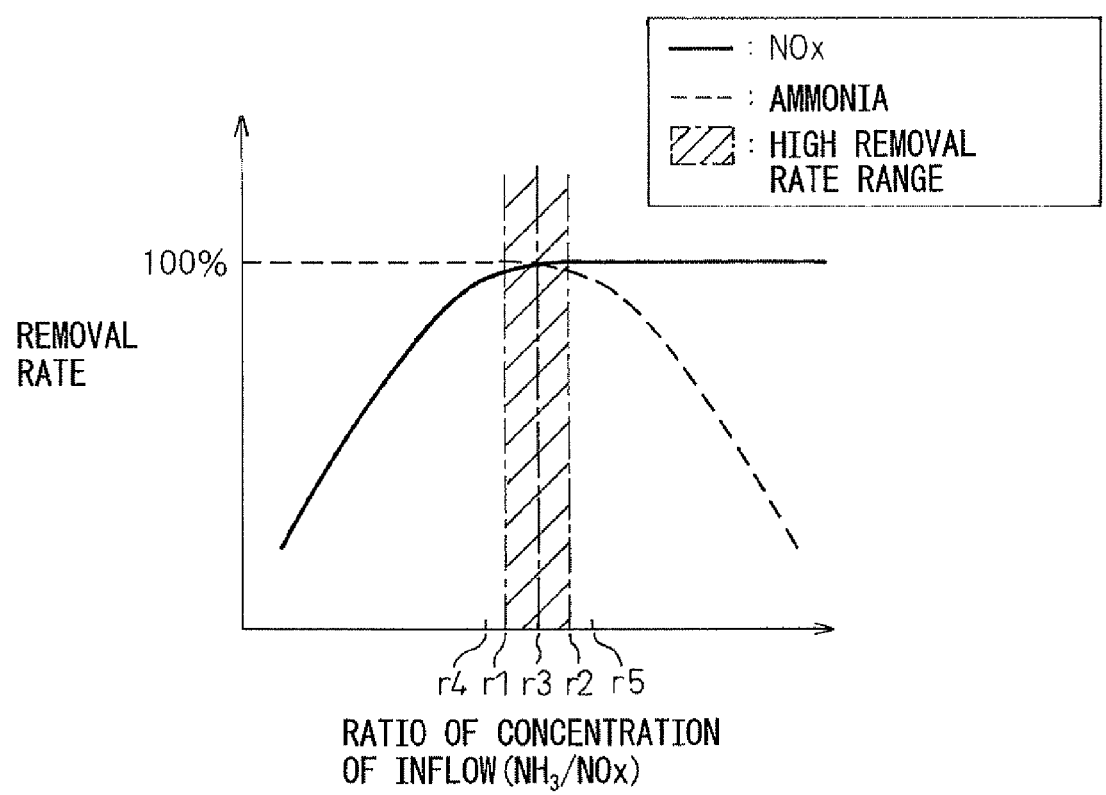
FIG. 2 is a graph which explains removal rates of an $NO_X$ selective reduction catalyst in the Embodiment 1.

FIG. 2 shows a graph of the removal rates of the $NO_X$ selective reduction catalyst in the present embodiment. The abscissa shows the ratio "r" of concentration of inflow, that is, the ratio of the molar concentration of ammonia to the $NO_X$ which are contained in the exhaust. The ordinate shows the removal rate. This can be shown by the following formula:

(Removal rate)=(concentration of substance flowing into $NO_X$ selective reduction catalyst−concentration of substance flowing out from $NO_X$ selective reduction catalyst)/(concentration of substance flowing into $NO_X$ selective reduction catalyst)   (3)

The ammonia removal rate is a substantially constant value in the region of the ratio r1 of concentration of inflow or less. In the present embodiment, the removal rate becomes substantially 100%. The ammonia removal rate decreases the larger the ratio of concentration of inflow in the region larger than the ratio r1 of concentration of inflow. As opposed to this, the $NO_X$ removal rate increases the larger the ratio of concentration of inflow in the region of less than the ratio r2 of concentration of inflow. Further, in the region of the ratio r2 of concentration of inflow or more, the ratio of concentration of inflow becomes substantially 100% and the $NO_X$ removal rate becomes substantially constant.

In the $NO_X$ selective reduction catalyst, it is possible to set a high removal rate range which shows high removal rates for both $NO_X$ and ammonia. In the present embodiment, the range of the ratio of concentration of inflow where the $NO_X$ removal rate becomes substantially maximum and, furthermore, the ammonia removal rate becomes substantially maximum is set as the high removal rate range. In the example which is shown in FIG. 2, the range of the ratio r1 of concentration of inflow to the ratio r2 of concentration of inflow is set as the high removal rate range.

The high removal rate range is not limited to this. It is possible to set a range near the ratio r3 of concentration of inflow where the $NO_X$ removal rate and the ammonia removal rate intersect with each other. For example, it is possible to set a range of the ratio r3 of concentration of inflow plus or minus a certain margin as the high removal rate range. As the ratio r3 of concentration of inflow of the $NO_X$ selective reduction catalyst in the present embodiment, 1 to 1.6 may be mentioned. For example, when the ratio r3 of concentration of inflow is 1.3, if setting the margin at one side to 0.05, it is possible to set the high removal rate range to 1.25 to 1.35 in range.

When the ratio of concentration of inflow is smaller than the high removal rate range, the ammonia in the exhaust is sufficiently oxidized and cracked to water and nitrogen. In this regard, the $NO_X$ is liable to not be able to be sufficiently reduced. When the ratio of concentration of inflow is larger than the high removal rate range, the $NO_X$ in the exhaust can be sufficiently reduced, but ammonia is liable to be exhausted without being sufficiently oxidized. The internal combustion engine of the present embodiment performs control which maintains the ratio of concentration of inflow inside the high removal rate range so that during the operating period, both the ammonia removal rate and the $NO_X$ removal rate become high.

Figure 3:
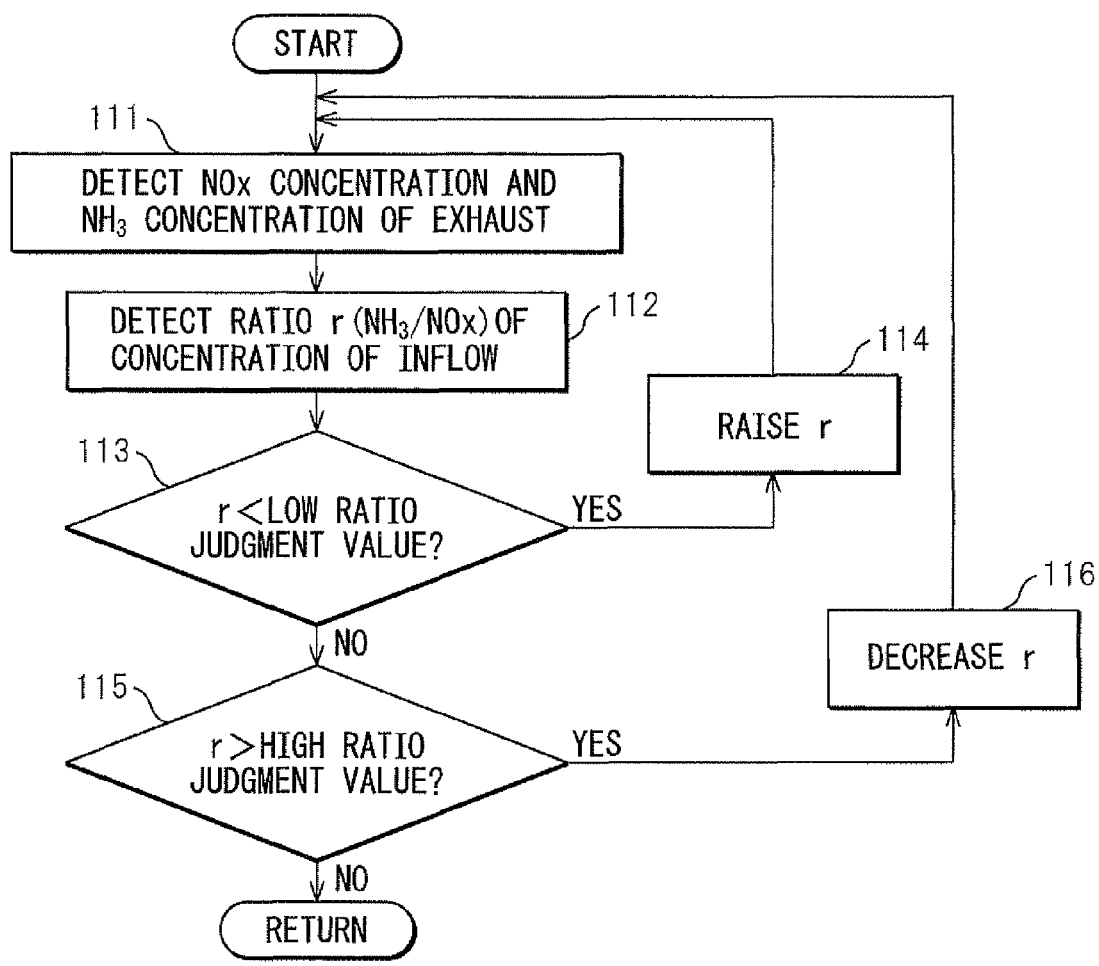
FIG. 3 is a flow chart of operational control of the internal combustion engine in the Embodiment 1.

FIG. 3 shows a flow chart of operational control of an internal combustion engine in the present embodiment. The operational control which is shown in FIG. 3 can be performed repeatedly at, for example, predetermined time intervals. In the internal combustion engine of the present embodiment, when the ratio of concentration of inflow has deviated from a predetermined judgment range, a control for adjusting the inflow concentration ratio where adjusts the ratio of concentration of inflow so as to return to inside this judgment range is performed.

At step 111, the $NO_X$ concentration and ammonia concentration of the exhaust which flows into the $NO_X$ selective reduction catalyst 92 are detected. These concentrations can be detected by an $NO_X$ sensor 94 or ammonia sensor 95 which is arranged at the upstream side of the $NO_X$ selective reduction catalyst 92.

Next, at step 112, the ammonia concentration and $NO_X$ concentration of the exhaust are used to calculate the ratio of concentration of ammonia to $NO_X$ of the exhaust, that is, the ratio r of concentration of inflow ($NH_3/NO_X$).

Next, at step 113, it is judged if the ratio r of concentration of inflow is smaller than a predetermined low ratio judgment value. As the predetermined low ratio judgment value, referring to FIG. 2, for example, it is possible to employ a ratio of the boundary value of the high removal rate range at the low ratio side, that is, the ratio r1 of concentration of inflow, plus a certain margin.

When, at step 113, the ratio r of concentration of inflow is less than the low ratio judgment value, the ratio of concentration of ammonia to $NO_X$ of the exhaust is low, so the $NO_X$ removal rate is liable to become low. In this case, the routine proceeds to step 114.

At step 114, control for adjusting the inflow concentration ratio which causes the ratio r of concentration of inflow to rise is performed. The control for adjusting the inflow concentration ratio will be explained later. For the amount of increase of the ratio r of concentration of inflow of the exhaust at step 114, for example, it is possible to employ a predetermined amount of increase. After step 114 is ended, the routine returns to step 111.

When, at step 113, the ratio r of concentration of inflow of the exhaust is the low ratio judgment value or more, the routine proceeds to step 115.

At step 115, it is judged if the ratio r of concentration of inflow is larger than a predetermined high ratio judgment value. As the predetermined high ratio judgment value, referring to FIG. 2, for example, it is possible to employ a ratio of the boundary value of the high removal rate range at the high ratio side, that is, the ratio r2 of concentration of inflow, minus a certain margin.

When, at step 115, the ratio r of concentration of inflow is larger than the high ratio judgment value, the ratio of concentration of ammonia to $NO_X$ of the exhaust is high, so the ammonia removal rate is liable to become low. In this case, the routine proceeds to step 116.

At step 116, control for adjusting the inflow concentration ratio which causes the ratio r of concentration of inflow to drop is performed. For the amount of decrease of the ratio r of concentration of inflow of the exhaust at step 116, for example, it is possible to employ a predetermined amount of decrease. After step 116 is ended, the routine returns to step 111.

When at step 115 the ratio r of concentration of inflow is the high ratio judgment value or less, this control is ended. In this case, it is possible to judge that the ratio r of concentration of inflow is in the high removal rate range. It is possible to judge that $NO_X$ and ammonia are both being removed by high removal rates.

In this way, in the operational control of the present embodiment, when it is judged that the ratio of concentration of ammonia to $NO_X$ of the exhaust which flows into the $NO_X$ selective reduction catalyst is liable to deviate from the high removal rate range, control is performed so that the ratio of concentration of inflow is maintained in the high removal rate range. By performing such control, it is possible to continue to remove $NO_X$ and ammonia by high removal rates. That is, it is possible to continue a superior removal performance. Further, it is possible to employ as a device for removing $NO_X$ an $NO_X$ selective reduction catalyst so as to keep down the use of platinum or palladium or other expensive precious metals required in a three-way catalyst etc. Note that, the $NO_X$ selective reduction catalyst in the present embodiment does not contain precious metal catalyst particles, but the invention is not limited to this. It is also possible to carry precious metal catalyst particles. For example, precious metal catalyst particles may be carried to improve the oxidation function of ammonia.

Further, it is possible to employ as the device for removing the $NO_X$ an $NO_X$ selective reduction catalyst so as to perform combustion so that in the combustion chambers, the air-fuel ratio at the time of combustion becomes lean. For example, when arranging a three-way catalyst in the exhaust purification system, if performing lean combustion in the combustion chambers, the exhaust removal rate falls. In particular, when performing lean combustion, the $NO_X$ removal rate falls. When arranging a three-way catalyst, it is preferable to perform control so that the air-fuel ratio at the time of combustion becomes substantially the stoichiometric air-fuel ratio (equivalent ratio of 1). As opposed to this, in the $NO_X$ selective reduction catalyst in the present embodiment, it is possible to achieve a high $NO_X$ removal rate even when performing lean combustion. For this reason, compared with when performing combustion by the stoichiometric air-fuel ratio, it is possible to improve the heat efficiency of the internal combustion engine.

In the present embodiment, it is judged if the ratio r of concentration of inflow is lower than a low ratio judgment value, then it is judged if the ratio r of concentration of inflow is higher than a high ratio judgment value, but the invention is not limited to this. It is also possible to judge if the ratio r of concentration of inflow is in a predetermined range from a low ratio judgment value to high ratio judgment value. If the ratio r of concentration of inflow is outside the above judgment range, it is possible to adjust the ratio r of concentration of inflow so that the ratio r of concentration of inflow returns to inside the above judgment range. For example, the order of the steps 113, 114 and steps 115, 116 in the present embodiment may be opposite.

In the present embodiment, the judgment range is provided inside the high removal rate range, but the invention is not limited to this. It is also possible to set the judgment range which is equal to the high removal rate range. For example, referring to FIG. 2, it is possible to set a low ratio judgment value at the ratio r1 of concentration of inflow and set the high ratio judgment value at the ratio r2 of concentration of inflow.

Next, control for adjusting the inflow concentration ratio which changes the ratio of concentration of ammonia to $NO_X$ which flow into the $NO_X$ selective reduction catalyst in the present embodiment will be explained. The internal combustion engine in the present embodiment uses fuel which contains ammonia. It is possible to perform control to leave at least part of the ammonia which is fed to the combustion chambers in the unburned state and have it exhausted from the combustion chambers so as to feed unburned ammonia to the $NO_X$ selective reduction catalyst. That is, it is possible to control the operating state of the internal combustion engine so as to feed the $NO_X$ selective reduction catalyst with a reducing agent comprised of ammonia.

For example, in an internal combustion engine which is fueled by gasoline, to feed the $NO_X$ selective reduction catalyst with a reducing agent comprised of ammonia, a urea injector is arranged which injects a aqueous urea solution inside of the engine exhaust passage. The aqueous urea solution which is fed to the inside of the engine exhaust passage is hydrolyzed by the heat of the exhaust. The hydrolysis of the aqueous urea solution results in ammonia being produced. The produced ammonia is fed to the $NO_X$ selective reduction catalyst. In such an internal combustion engine, a urea injector, urea tank and other device was necessary for feeding an aqueous urea solution to the engine exhaust passage. As opposed to this, in the internal combustion engine of the present embodiment, it is possible to make the operating state change so as to feed ammonia to the $NO_X$ selective reduction catalyst.

In the first control for adjusting the inflow concentration ratio of the present embodiment, it is possible to adjust the air-fuel ratio when burning fuel in the combustion chambers so as to adjust the ratio of concentration of ammonia to $NO_X$ of the exhaust which flows out from the combustion chambers and adjust the ratio of concentration of the exhaust which flows into the $NO_X$ selective reduction catalyst.

In the internal combustion engine in the present embodiment, the combustion is performed in the state where the air-fuel ratio at the time of combustion is lean. In particular, in the present embodiment, lean combustion is used to burn the fuel. By making the air-fuel ratio at the time of combustion fall (increasing the equivalent ratio of the air-fuel mixture), the concentration of unburned ammonia in the exhaust increases. On the other hand, $NO_X$ is produced in the middle of the process of combustion of ammonia, so even if making the air-fuel ratio at the time of combustion approach the stoichiometric air-fuel ratio, the $NO_X$ which is exhausted from the combustion chambers does not change much. For this reason, it is possible to make the air-fuel ratio at the time of combustion fall so as to make the ratio of concentration of exhaust ($NH_3/NO_X$) which flows out from the combustion chambers rise. Further, it is possible to make the air-fuel ratio at the time of combustion rise (reduce the equivalent ratio of the air-fuel mixture) so as to cause the ratio of concentration ($NH_3/NO_X$) of the exhaust which flows out from the combustion chambers fall.

The air-fuel ratio at the time of combustion can be adjusted by changing the amount of fuel or the amount of air which is fed to the combustion chambers. In the adjustment of the air-fuel ratio of the present embodiment, the ratio of mixture of hydrogen and ammonia of the air-fuel mixture is maintained substantially constant while the ratio of air to the fuel is changed. For example, it is possible to not change the amount of ammonia and amount of hydrogen which are fed to the combustion chambers and decrease the amount of air so as to reduce the air-fuel ratio at the time of combustion. Alternatively, it is possible to maintain the amount of air which is fed to the combustion chambers constant, while increasing the amount of fuel which is fed to the combustion chambers so as to reduce the air-fuel ratio in the state where the mixture ratio of hydrogen and ammonia is maintained constant.

Next, the second control for adjusting the inflow concentration ratio of the present embodiment will be explained. In the second control for adjusting the inflow concentration ratio of the present embodiment, it is possible to change the ratio of hydrogen to ammonia which is contained in the fuel which is fed to the combustion chambers so as to adjust the ratio of concentration of ammonia to $NO_X$ of the exhaust which flows out from the combustion chambers.

Hydrogen is superior in combustibility to ammonia, so has the function of promoting the combustion of ammonia. If increasing the ratio of ammonia to hydrogen of the fuel which is fed to the combustion chambers, the combustion in the combustion chambers becomes slower. By reduction of the ratio of hydrogen which functions as a material which assists the combustion of fuel, the speed of combustion in the combustion chambers becomes slower. For this reason, the unburned ammonia which remains without being burned in the combustion chambers becomes greater. On the other hand, the amount of $NO_X$ which is included in the exhaust which is exhausted from the combustion chambers decreases, so the ratio of concentration of inflow can be raised.

In the second control for adjusting the inflow concentration ratio of the present embodiment, referring to FIG. 1, it is possible to adjust at least one amount of feed in the amount of feed of fuel from the hydrogen injector 86 and the amount of feed of fuel from the ammonia injector 83 so as to adjust the ratio of hydrogen to ammonia which are fed to the combustion chambers. For example, it is possible to make the amount of fuel which is injected from the hydrogen injector 86 decrease and make the amount of fuel which is injected from the ammonia injector 83 increase so as to make the ratio of concentration of inflow rise.

Further, in the second control for adjusting the inflow concentration ratio, it is possible to adjust the ratio of hydrogen to ammonia of the gas which is fed to the hydrogen injector 86 so as to adjust the ratio of hydrogen to ammonia which are contained in the fuel which is fed to the combustion chambers. In the hydrogen generator of the present embodiment, the catalyst 60 is used to crack ammonia so as to produce hydrogen. The gas which flows out from the cracker 51 contains not only hydrogen, but also the ammonia which could not be cracked. The ammonia concentration and hydrogen concentration of the gas which flows out from the catalyst 60 can be adjusted by changing the ratio of air to ammonia which is fed to the catalyst 60.

Figure 4:
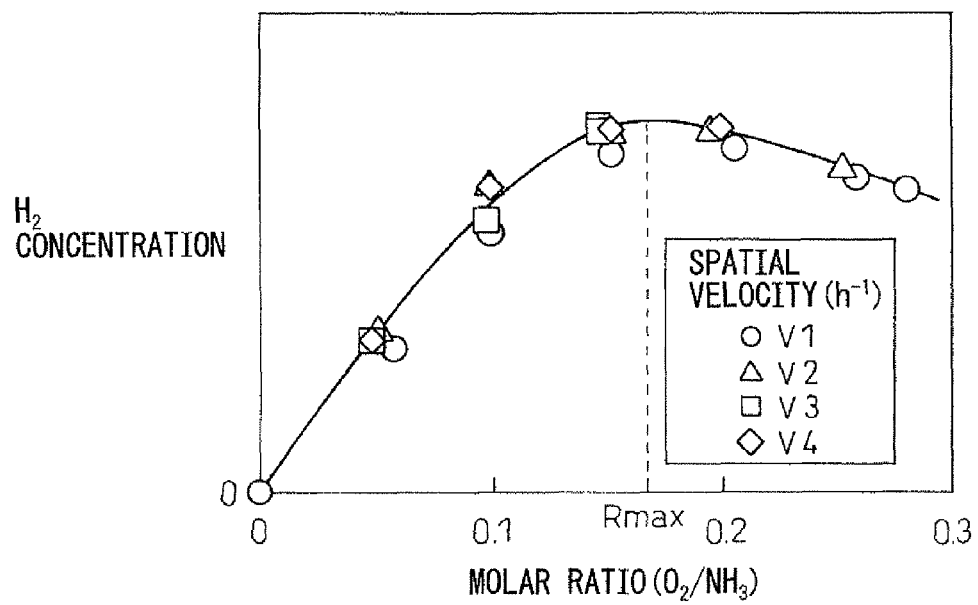
FIG. 4 is a graph which shows the relationship between a molar ratio of gas which flows into a cracker and a hydrogen concentration of gas which flows out from the cracker in the embodiment.

FIG. 4 is a graph which explains the relationship of the molar ratio of oxygen to ammonia of the gas which is fed to the cracker of the present embodiment and a hydrogen concentration of gas which flows out from the cracker. In FIG. 4, instead of the molar ratio of air, this is shown by the molar ratio of oxygen. In this test, the spatial velocity is changed from the velocity V1 to the velocity V4 to conduct a plurality of tests. It is learned that if gradually making the molar ratio of oxygen to ammonia rise from near zero, the hydrogen concentration of the produced gas rises. At the molar ratio Rmax, the hydrogen concentration becomes maximum. In the region larger than the molar ratio Rmax, the larger the molar ratio becomes, the more the hydrogen concentration is reduced.

Figure 5:
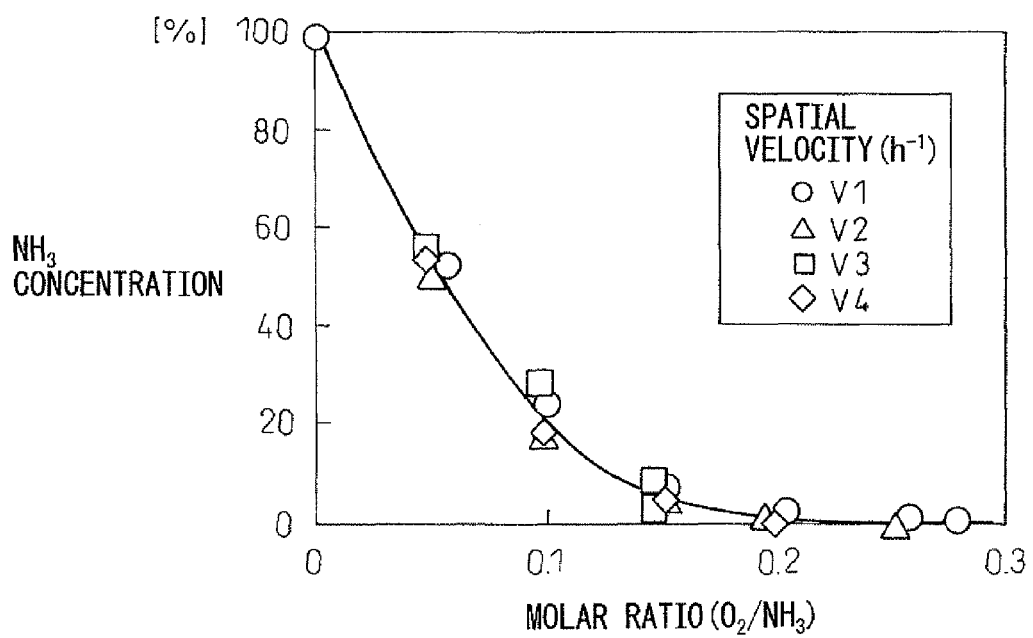
FIG. 5 is a graph which shows the relationship between a molar ratio of gas which flows into a cracker and an ammonia concentration of gas which flows out from the cracker in the embodiment.

FIG. 5 is a graph which explains the relationship of the molar ratio of oxygen to ammonia of the gas which is fed to the cracker of the present embodiment and an ammonia concentration of gas which flows out from the cracker. The ordinate is the concentration of ammonia which flows out from the cracker without being cracked. It is learned that if raising the molar ratio of oxygen to ammonia, the concentration of ammonia which flows out from the cracker falls. It is learned that if the molar ratio of oxygen to ammonia is about 0.2, the ammonia concentration of the gas which flows out from the cracker becomes zero. That is, it is learned that the ammonia which is fed to the cracker is substantially completely consumed.

Referring to FIG. 4 and FIG. 5, in the region where the molar ratio of oxygen to ammonia is small, the amount of heat for cracking the ammonia is insufficient. If making the molar ratio of oxygen to ammonia rise, the temperature of the catalyst rises. For this reason, the hydrogen concentration of the gas which flows out from the cracker rises, while the ammonia concentration of the gas which flows out from the cracker falls.

In this regard, if the molar ratio of oxygen to ammonia exceeds about 0.2, all of the ammonia which is fed is consumed. Furthermore, the hydrogen which is produced is consumed by the oxidation reaction. For this reason, if making the molar ratio of oxygen to ammonia rise, the hydrogen concentration of the produced gas falls. In this way, by changing the molar ratio of oxygen to ammonia which is fed to the cracker, it is possible to adjust the concentration of hydrogen and the concentration of ammonia which are contained in the gas which flows out from the hydrogen generator. Further, from the graphs of FIG. 4 and FIG. 5, it is learned that even if changing the spatial velocity of the gas which flows into the catalyst, the hydrogen concentration and ammonia concentration of the produced gas are substantially the same.

The cracker of the internal combustion engine of the present embodiment operates in the region where the molar ratio of oxygen to ammonia is Rmax or less. It is possible to adjust the ratio of the air to the ammonia which is fed to the cracking catalyst so as to adjust the ratio of hydrogen to ammonia which is fed to the hydrogen injector. For example, it is possible to make the ratio of air to ammonia which are fed to the catalyst fall in the operating region of the present embodiment so as to make the ratio of hydrogen to ammonia of the gas which is injected from the hydrogen injector fall. As a result, it is possible to make the ratio of hydrogen to ammonia which are fed to the combustion chambers fall. On the other hand, it is possible to make the ratio of air to ammonia which are fed to the catalyst rise so as to make the ratio of hydrogen to ammonia of the gas which is injected from the hydrogen injector rise.

Next, third control for adjusting the inflow concentration ratio of the present embodiment will be explained. In the third control for adjusting the inflow concentration ratio, the ignition timing in the combustion chambers is adjusted to adjust the ratio of concentration of the exhaust ($NH_3/NO_X$) which flows out from the combustion chambers.

The internal combustion engine has an MBT (minimum advance for best torque) ignition timing as the ignition timing at which the torque which is output becomes maximum. In an internal combustion engine which is fueled by gasoline, in particular at the time of high load, if igniting the fuel near the MBT ignition timing, knocking and other abnormal combustion occur, so the fuel is ignited at the retarded side from the MBT ignition timing. In this regard, in an internal combustion engine fueled by ammonia, there is greater resistance to the occurrence of knocking and other abnormal combustion compared with an internal combustion engine which is fueled by only gasoline, so it is possible to ignite the fuel near the MBT ignition timing. In the present embodiment, the fuel is ignited near the MBT ignition timing during the period of ordinary operation.

In this regard, in an internal combustion engine which is fueled by gasoline explained as a comparative example, at the time of combustion, the temperature becomes high and $NO_X$ is produced from the nitrogen component which is contained in the air. In this regard, in an internal combustion engine fueled by ammonia, the fuel contains nitrogen component. The $NO_X$ which is contained in the exhaust is mainly produced in the process of combustion of ammonia. For this reason, an internal combustion engine which is fueled by ammonia, compared with an internal combustion engine which is fueled by gasoline, has the property of the amount of $NO_X$ which is contained in the exhaust being resistant to the effect of the combustion temperature. In an internal combustion engine which is fueled with ammonia, even if changing the ignition timing, there is little effect on the amount of $NO_X$ which flows out from the combustion chambers. On the other hand, if changing the ignition timing, the amount of unburned ammonia is affected. For example, if retarding the ignition timing, the period of afterburn becomes longer and the amount of unburned ammonia is reduced. Furthermore, if retarding the ignition timing, the exhaust temperature rises and the oxidation of the unburned ammonia in the exhaust port is promoted. For this reason, the amount of ammonia which is contained in the exhaust decreases.

In the third control for adjusting the inflow concentration ratio, it is possible to retard the ignition timing so as to decrease the amount of unburned ammonia and make the ratio of concentration of inflow fall. Alternatively, it is possible to advance the ignition timing to make the ratio of concentration of inflow rise.

Next, fourth control for adjusting the inflow concentration ratio of the present embodiment will be explained. In the fourth control for adjusting the inflow concentration ratio of the present embodiment, a reducing agent feed valve for feeding a reducing agent in the engine exhaust passage is arranged and the amount of feed of the reducing agent from the reducing agent feed valve is adjusted to adjust the ratio r of concentration of inflow ($NH_3/NO_X$). As the reducing agent which is fed to the engine exhaust passage, urea or ammonia may be illustrated.

For example, it is possible to increase the amount of reducing agent which is fed to the engine exhaust passage so as to make the ratio of concentration of inflow rise. Further, it is possible to decrease the amount of reducing agent which is fed to the engine exhaust passage so as to make the ratio of concentration of inflow fall.

When arranging a reducing agent feed valve in the engine exhaust passage, when the amount of ammonia which slips through the $NO_X$ selective reduction catalyst becomes greater, it is preferable to perform control to stop the feed of the reducing agent from the reducing agent feed valve. For example, it is possible to arrange an ammonia sensor downstream of the $NO_X$ selective reduction catalyst in the engine exhaust passage. When the concentration of ammonia which is detected by the ammonia sensor exceeds a predetermined judgment value, it is preferable to perform control to stop the feed of the reducing agent.

The control for adjusting the inflow concentration ratio where the ratio of concentration of inflow is adjusted is not limited to the above control. It is possible to set any device for adjusting the ratio of concentration of ammonia to $NO_X$ which is contained in the exhaust which flows into the $NO_X$ selective reduction catalyst and perform any control.

The cracker of the hydrogen generator includes a cracking catalyst for cracking the ammonia plus an oxidation catalyst for oxidizing the ammonia, but the invention is not limited to this. It is also possible to apply the present invention to an internal combustion engine which is provided with a cracker which does not contain an oxidation catalyst, but contains a cracking catalyst. In this case, a heater etc. at the outside of the cracking catalyst can be used to supply heat for continuing the cracking of the ammonia to the cracking catalyst.

In the present embodiment, the output of the $NO_X$ sensor and the output of the ammonia sensor which are arranged at the upstream side of the $NO_X$ selective reduction catalyst are used to estimate the ratio of concentration of inflow, but the invention is not limited to this. Any devices may be used to estimate the ratio of concentration of inflow. For example, an $NO_X$ sensor and ammonia sensor may be arranged downstream of the $NO_X$ selective reduction catalyst. In this case, it is possible to detect at least one of the $NO_X$ concentration and ammonia concentration of the exhaust which flows out from the $NO_X$ selective reduction catalyst and use at least one concentration of the detected $NO_X$ concentration and ammonia concentration as the basis to estimate the ratio of concentration of inflow. If the detected $NO_X$ concentration or ammonia concentration is higher than a predetermined judgment value, it is possible to judge that the ratio of concentration of inflow is outside the predetermined judgment range.

Referring to FIG. 2, when the concentration of ammonia which flows out from the $NO_X$ selective reduction catalyst is higher than the predetermined judgment value, it can be judged that the ammonia removal rate is low. That is, it is possible to judge that the ratio of concentration of inflow is larger than a predetermined high ratio judgment value. In this case, control may be performed to make the ratio r of concentration of inflow fall. When the concentration of $NO_X$ which flows out from the $NO_X$ selective reduction catalyst is higher than the predetermined judgment value, it can be judged that the $NO_X$ removal rate is low. That is, it is possible to judge that the ratio of concentration of inflow is smaller than a predetermined low ratio judgment value. In this case, control is performed to make the ratio r of concentration of inflow rise.

Alternatively, it is possible to arrange $NO_X$ sensors at both upstream of the $NO_X$ selective reduction catalyst in the engine exhaust passage and downstream of the $NO_X$ selective reduction catalyst in the engine exhaust passage. The $NO_X$ concentration of the exhaust which flows into the $NO_X$ selective reduction catalyst and the $NO_X$ concentration of the exhaust which flows out from the $NO_X$ selective reduction catalyst may also be used as the basis to calculate the $NO_X$ removal rate. For the ammonia removal rate as well, in the same way, ammonia sensors may be arranged at the upstream side and downstream side of the $NO_X$ selective reduction catalyst so as to calculate the ammonia removal rate. These removal rates may be used as the basis to judge if the ratio of concentration of inflow is in the predetermined judgment range.

Figure 6:
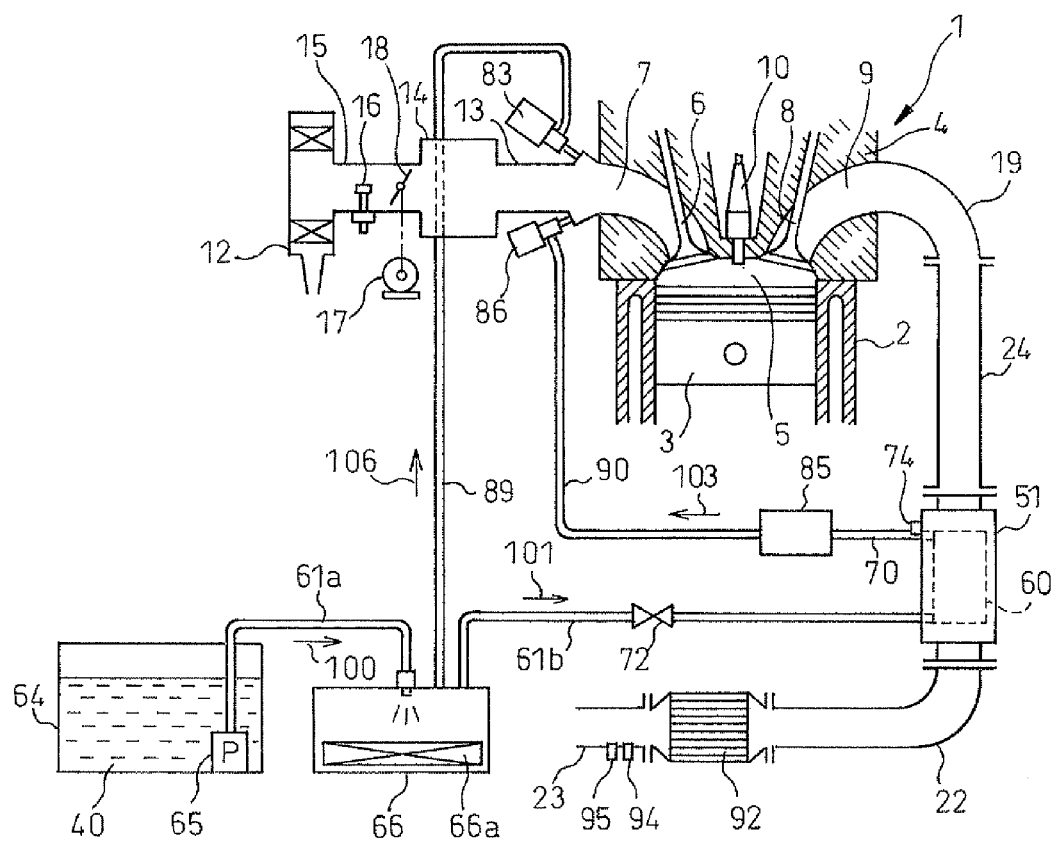
FIG. 6 is a schematic view of another internal combustion engine in an Embodiment 1.

FIG. 6 is a schematic view of another internal combustion engine in the present embodiment. The other internal combustion engine in the present embodiment includes a cracker 51 which cracks ammonia. The catalyst 60 of the cracker 51 does not contain catalyst particles for oxidizing the ammonia and is comprised of a cracking catalyst. In the other internal combustion engine, the cracker 51 is formed so that the catalyst 60 is heated by the heat of the exhaust gas.

The exhaust manifold 19 is connected through the exhaust pipe 24 to the cracker 51. The cracker 51 is formed to be able to transfer the heat of the exhaust to the catalyst 60. By heat exchange of the exhaust and the catalyst 60, the heat which is required for continuation of cracking of ammonia is supplied.

The catalyst 60 of the cracker 51 is fed with vaporized ammonia from the ammonia feed tube 61b. In the cracker 51, at least part of the ammonia is cracked. The hydrogen which is produced at the catalyst 60 and the ammonia which was not cracked at the catalyst 60 are fed, as shown by the arrow 103, through the cooler 85 to the hydrogen injector 86.

The cracker 51 is connected through the exhaust pipe 22 to the $NO_X$ selective reduction catalyst 92. The $NO_X$ selective reduction catalyst 92 is connected to the exhaust pipe 22. Downstream of the $NO_X$ selective reduction catalyst 92, an $NO_X$ sensor 94 which detects the concentration of $NO_X$ which flows out from the $NO_X$ selective reduction catalyst 92 and an ammonia sensor 95 which detects the concentration of ammonia which flows out from the $NO_X$ selective reduction catalyst 92 are arranged.

In the other internal combustion engine in the present embodiment, the $NO_X$ concentration of the gas which flows out from the $NO_X$ selective reduction catalyst 92 is detected by the $NO_X$ sensor 94. Further, the ammonia concentration of the gas which flows out from the $NO_X$ selective reduction catalyst 92 is detected by the ammonia sensor 95. The judgment value of the ammonia concentration and the judgment value of the $NO_X$ concentration of the gas which flows out from the $NO_X$ selective reduction catalyst 92 can be set in advance. By comparing the judgment value of the ammonia concentration and the judgment value of the $NO_X$ concentration and the detection values of these concentrations, it is possible to judge if the ratio of concentration of inflow is in the predetermined judgment range.

When the ratio of concentration of inflow is outside the predetermined judgment range, it is possible to perform control for adjusting the inflow concentration ratio. In the other internal combustion engine as well, it is possible to perform control for adjusting the inflow concentration ratio. For example, when performing the second control for adjusting the inflow concentration ratio, it is possible to adjust the amount of feed of ammonia from the ammonia injector 83 and the amount of feed of hydrogen from the hydrogen injector 86 so as to change the ratio of hydrogen to ammonia which are fed to the combustion chambers.

In this regard, the $NO_X$ removal rate and ammonia removal rate of the $NO_X$ selective reduction catalyst depend on the type etc. of the $NO_X$ selective reduction catalyst. When setting a high removal rate range where the $NO_X$ removal rate and ammonia removal rate become high, it is possible to set it in accordance with the type etc. of the $NO_X$ selective reduction catalyst which is arranged in the engine exhaust passage.

Figure 7:
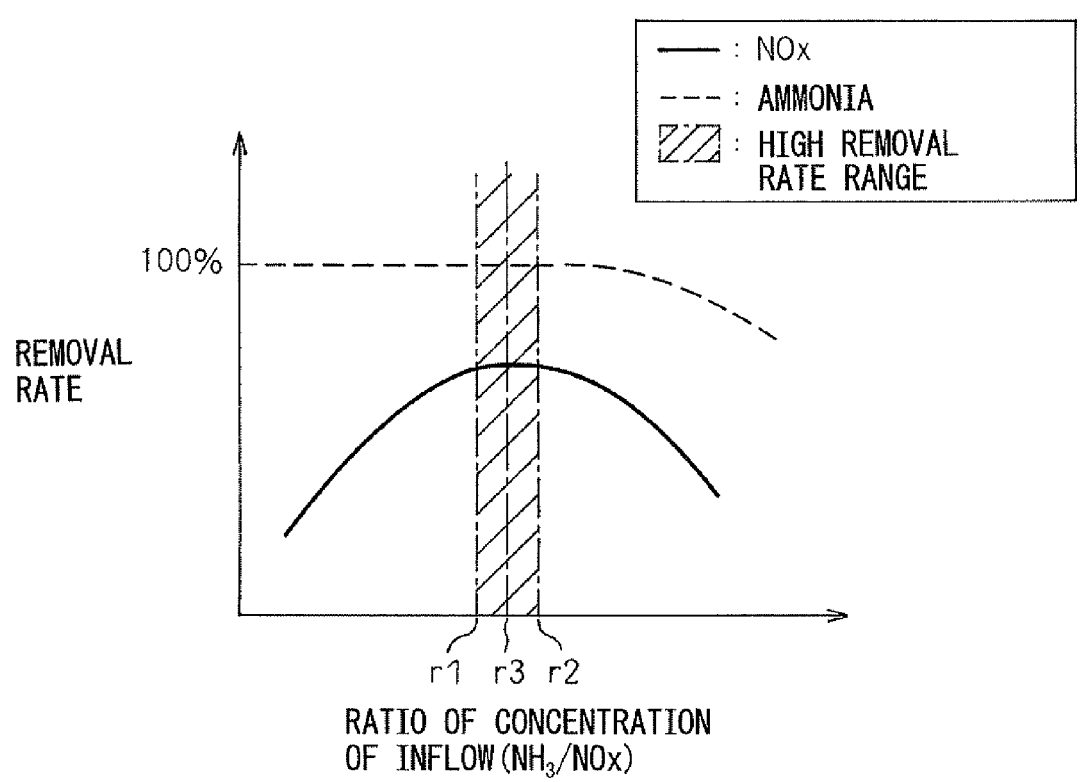
FIG. 7 is a graph which explains removal rates of the other $NO_X$ selective reduction catalyst in the Embodiment 1.

FIG. 7 shows a graph of the removal rates of another $NO_X$ selective reduction catalyst of the present embodiment. The other $NO_X$ selective reduction catalyst contains zeolite which carries copper by ion exchange. The other $NO_X$ selective reduction catalyst has the property of the $NO_X$ removal rate becoming maximum at the ratio r3 of concentration of inflow. The ammonia removal rate is a substantially constant value in the region of a predetermined ratio of concentration of inflow or less, but has the property of gradually decreasing if the ratio becomes larger than the predetermined ratio of concentration of inflow.

In the other $NO_X$ selective reduction catalyst of the present embodiment, near the ratio r3 of concentration of inflow, it is possible to set a high removal rate range where the removal rates of both $NO_X$ and ammonia become substantially maximum. It is possible to add or subtract a predetermined amount to or from the ratio r3 of concentration of inflow to set the ratio r1 of concentration of inflow and the ratio r2 of concentration of inflow. The range from the ratio r1 of concentration of inflow to the ratio r2 of concentration of inflow can be set as the high removal rate range.

Furthermore, the $NO_X$ selective reduction catalyst is not limited to the above-mentioned $NO_X$ selective reduction catalyst containing zeolite which carries iron or $NO_X$ selective reduction catalyst containing zeolite which carries copper. It may include any $NO_X$ selective reduction catalyst which can selectively reduce $NO_X$.

The hydrogen generator in the present embodiment vaporizes the liquid material, then feeds it to the cracking catalyst, but the invention is not limited to this. It is also possible to store gaseous fuel and feed the gaseous fuel to the cracking catalyst.

Embodiment 2

Figure 8:
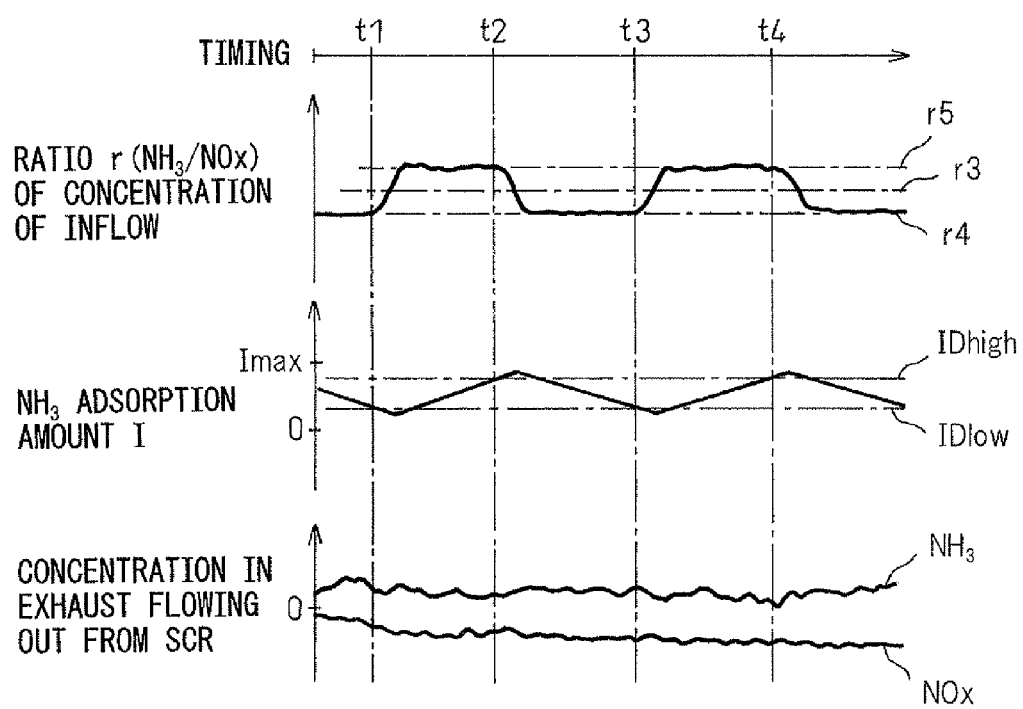
FIG. 8 is a time chart of the operational control of the internal combustion engine in an Embodiment 2.
Figure 9:
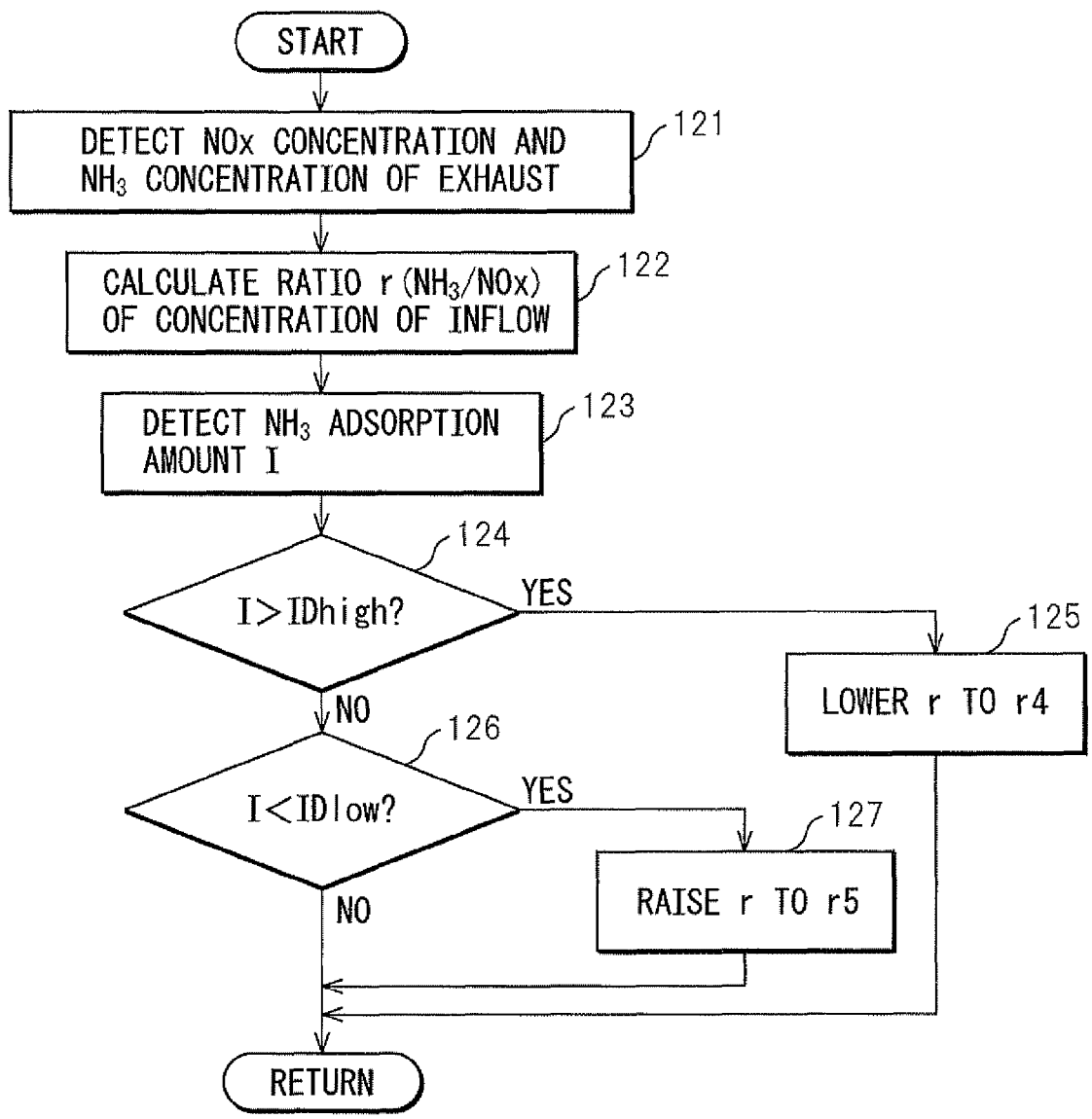
FIG. 9 is a flow chart of operational control of the internal combustion engine in the Embodiment 2.

Referring to FIG. 8 and FIG. 9, an internal combustion engine in the Embodiment 2 will be explained. The internal combustion engine in the present embodiment performs control to make the ratio of concentration of ammonia to $NO_X$ of the exhaust which flows into the $NO_X$ selective reduction catalyst periodically change.

In the present embodiment, an internal combustion engine (see FIG. 1) which is provided with a catalyst which has an ammonia cracking function and oxidation function and an $NO_X$ selective reduction catalyst which contains zeolite which carries iron by ion exchange will be explained as an example. The $NO_X$ selective reduction catalyst in the present embodiment has an ammonia adsorbing function. The $NO_X$ selective reduction catalyst which has an ammonia adsorbing function is not limited to zeolite which carries iron by ion exchange. For example, zeolite which carries a transition metal may also be illustrated.

The $NO_X$ selective reduction catalyst in the present embodiment has the ability to adsorb ammonia, so when a greater amount of ammonia than the ammonia which is required for removal of $NO_X$ flows in, the excess ammonia can be adsorbed. Further, when an amount of ammonia less than the ammonia which is required for removal of $NO_X$ flows in, the adsorbed ammonia can be used to remove the $NO_X$.

In the $NO_X$ selective reduction catalyst, when the amount of adsorption of ammonia is insufficient and, in that state, an amount of ammonia less than the ammonia which is required for removal of $NO_X$ flows in, $NO_X$ can no longer be sufficiently removed. On the other hand, if the amount of adsorption of ammonia becomes greater, the amount of ammonia which can be adsorbed is reduced and sometimes ammonia will slip through the $NO_X$ selective reduction catalyst.

In the internal combustion engine of the present embodiment, control where the ratio of concentration of inflow is maintained in a range larger than a reference ratio of concentration and control where the ratio of concentration of inflow is maintained in a range smaller than a reference ratio of concentration are repeatedly performed. In the present invention, the ratio of concentration of inflow which removes all of the $NO_X$ which flows into the $NO_X$ selective reduction catalyst is called the "reference ratio of concentration". That is, the reference ratio of concentration is the ratio of concentration of ammonia to $NO_X$ when the exact amount of ammonia is consumed when removing $NO_X$ at the $NO_X$ selective reduction catalyst. The reference ratio of concentration can be set in advance. Referring to FIG. 2, in the present embodiment, the ratio r3 of concentration of inflow corresponds to the reference ratio of concentration.

Furthermore, the present embodiment estimates the amount of adsorption of ammonia of the $NO_X$ selective reduction catalyst and uses the estimated amount of adsorption of ammonia as the basis for control for adjusting the inflow concentration ratio so as to make the ratio of concentration of inflow change.

If the amount I of adsorption of ammonia of the $NO_X$ selective reduction catalyst is lower than the lower limit judgment value $ID_{low}$, control may be performed to make the ratio r of concentration of inflow rise. The lower limit judgment value $ID_{low}$ may be set in advance. For example, for the lower limit judgment value $ID_{low}$, a value giving a certain margin to zero may be employed. If the amount I of adsorption of ammonia is higher than the upper limit judgment value $ID_{high}$, control may be performed to make the ratio r of concentration of inflow fall. The upper limit judgment value $ID_{high}$ may be set in advance. For the upper limit judgment value $ID_{high}$, for example, a value of the saturated amount of adsorption of ammonia of the $NO_X$ selective reduction catalyst (maximum amount $I_{max}$ of ammonia which the $NO_X$ selective reduction catalyst can adsorb) minus a certain margin may be employed.

The ratio r of concentration of inflow can be adjusted in the same way as in the Embodiment 1 by any control for adjusting the inflow concentration ratio. For example, this may be done by control for adjusting the air-fuel ratio of the air-fuel mixture which is burned in the combustion chambers, control for adjusting the ratio of hydrogen to ammonia which are fed to the combustion chambers, control for adjusting the amount of ammonia which is directly fed to the engine exhaust passage, or other control.

FIG. 8 shows a time chart of operational control of the internal combustion engine in the present embodiment. In this example of operation, at the time t1, the amount I of adsorption of ammonia is less than the lower limit judgment value $ID_{low}$. For this reason, from the time t1 on, control is performed to make the ratio r of concentration of inflow rise. The ratio r of concentration of inflow is made to rise so as to become larger than the ratio r3 of concentration of inflow where the $NO_X$ and ammonia exactly react. In the present embodiment, the ratio is made to rise to the predetermined ratio r5 of concentration of inflow.

After the ratio r of concentration of inflow reaches the ratio r5 of concentration of inflow, control is performed to maintain the ratio r of concentration of inflow at the ratio r5 of concentration of inflow. The amount of ammonia which is contained in the exhaust which flows into the $NO_X$ selective reduction catalyst becomes excessive. The ammonia which was not used for reduction of the $NO_X$ and, furthermore, was not oxidized is adsorbed at the $NO_X$ selective reduction catalyst. The amount I of adsorption of ammonia by the $NO_X$ selective reduction catalyst increases.

At the time t2, the amount I of adsorption of ammonia becomes larger than the upper limit judgment value $ID_{high}$. For the upper limit judgment value $ID_{high}$ in the present embodiment, a value which is smaller than the maximum value $I_{max}$ of the amount of adsorption of ammonia by the $NO_X$ selective reduction catalyst is employed. At the time t2 and on, control is performed to make the ratio r of concentration of inflow fall. The ratio r of concentration of inflow is made to fall to less than the ratio r3 of concentration of inflow where the $NO_X$ and ammonia exactly react. In the present embodiment, the ratio is made to fall to the ratio r4 of concentration of inflow. After reaching the ratio r4 of concentration of inflow, control is performed to maintain the ratio at the ratio r4 of concentration of inflow. The amount of ammonia which is contained in the exhaust which flows into the $NO_X$ selective reduction catalyst becomes insufficient. The $NO_X$ is removed by the ammonia which was adsorbed at the $NO_X$ selective reduction catalyst. The amount I of adsorption of ammonia by the $NO_X$ selective reduction catalyst falls.

At the time t3, the amount I of adsorption of ammonia by the $NO_X$ selective reduction catalyst becomes less than the lower limit judgment value $ID_{low}$ and the ratio r of concentration of inflow is made to rise. At the time t4, the amount I of adsorption of ammonia becomes larger than the upper limit judgment value $ID_{high}$ and the ratio r of concentration of inflow is made to fall.

By periodically making the ratio r of concentration of inflow change in this way, it is possible to remove the $NO_X$ which flows into the $NO_X$ selective reduction catalyst. Further, it is possible to keep ammonia from flowing out from the $NO_X$ selective reduction catalyst.

Referring to FIG. 2 and FIG. 8, in the internal combustion engine of the present embodiment, the ratio r of concentration of inflow is preferably made to change in the high removal rate range. In the example which is shown in FIG. 2, the ratio r of concentration of inflow is preferably made to change in the range of the ratio r1 of concentration of inflow to the ratio r2 of concentration of inflow.

Alternatively, the ratio r of concentration of inflow is preferably made to change while skipping the high removal rate range. That is, when maintaining the ratio r of concentration of inflow high, the ratio is preferably maintained at a value higher than the ratio r2 of concentration. For example, the ratio is preferably made to rise to the ratio r5 of concentration of inflow. When maintaining the ratio r of concentration of inflow low, the ratio is preferably maintained at a value lower than the ratio r1 of concentration. For example, the ratio is preferably made to fall to the ratio r4 of concentration of inflow. By performing control to change the ratio r of concentration of inflow while traversing the high removal rate range in this way, it is possible to purify the exhaust at the high removal rate range or near the high removal rate range and efficiently remove $NO_X$ and ammonia.

FIG. 9 is a flowchart of operational control in the present embodiment. The control which is shown in FIG. 9 may be repeated, for example, every predetermined time interval.

At step 121, the concentration of $NO_X$ and the concentration of ammonia which flow into the $NO_X$ selective reduction catalyst 92 are detected. These concentrations can be detected by an $NO_X$ sensor 94 or ammonia sensor 95 which is arranged at the upstream side of the $NO_X$ selective reduction catalyst 92.

Next, at step 122, the detected ammonia concentration and $NO_X$ concentration are used as the basis to calculate the ratio of concentration of ammonia to $NO_X$ of the exhaust flowing into the $NO_X$ selective reduction catalyst 92, that is, the ratio r of concentration of inflow ($NH_3/NO_X$).

Next, at step 123, the amount I of adsorption of ammonia at the $NO_X$ selective reduction catalyst is calculated. In the calculation of the amount of adsorption of ammonia in the present embodiment, the following formula (4) may be used for the calculation.

$$I_i = I_{i-1} + \int_{t_{i-1}}^{t_i} ma \cdot y_{nox} \cdot (r-r3) dt \quad (4)$$

Here, the variable $I_i$ is the amount of adsorption of ammonia which was calculated at the current calculation, while the variable $I_{i-1}$ is the amount of adsorption of ammonia which was calculated at the previous calculation. The variable $t_i$ is the time when the current calculation was performed, while the variable $t_{i-1}$ is the time when the previous calculation was performed. The variable ma is the flow rate of intake air. The variable $y_{nox}$ is the $NO_X$ concentration of the exhaust which flows into the $NO_X$ selective reduction catalyst. The constant r3 is the ratio of concentration of inflow for the $NO_X$ and ammonia to react exactly with each other. The variable r is the ratio of concentration of inflow in the current calculation. Here, the variable $ma \cdot y_{nox}(r-r3)$ indicates the amount of excess or the amount of shortage of ammonia which flows into the $NO_X$ selective reduction catalyst. Further, in calculation of the amount $I_i$ of adsorption of ammonia of the present embodiment, rather than use the flow rate of exhaust which flows into the $NO_X$ selective reduction catalyst, the flow rate of intake air is used as an approximation.

In the calculation of the amount of adsorption of ammonia of the above formula (4), the amount $I_b$ of adsorption of ammonia becoming the reference at some time period can be estimated and the reference amount $I_b$ of adsorption of ammonia entered for the amount $I_{i-1}$ of adsorption of ammonia to start the calculation. For example, control may be performed so as to maintain the amount of ammonia which is fed to the $NO_X$ selective reduction catalyst in a short state for a predetermined time period right after startup of the internal combustion engine so as to make the amount of adsorption of ammonia at the $NO_X$ selective reduction catalyst zero. The amount $I_{i-1}$ of adsorption of ammonia can be set to zero and this time used as the reference for starting the calculation of the amount of adsorption of ammonia. Alternatively, it is possible to set the amount $I_{i-1}$ of adsorption of ammonia for the saturated amount $I_{max}$ of adsorption of the $NO_X$ selective reduction catalyst when making the $NO_X$ selective reduction catalyst adsorb ammonia and ammonia flows out from the $NO_X$ selective reduction catalyst.

The calculation of the amount of adsorption of ammonia is not limited to this. Any control may be employed which enables estimation of the amount of adsorption of ammonia.

Next, step 124, it is judged if the calculated amount I of adsorption of ammonia is larger than the upper limit judgment value $ID_{high}$ of the amount of adsorption of ammonia. If, at step 124, the amount I of adsorption of ammonia is larger than the upper limit judgment value $ID_{high}$, the routine proceeds to step 125.

At step 125, control is performed to make the ratio r of concentration of inflow fall. In the present embodiment, the ratio is made to fall to the predetermined ratio r4 of concentration of inflow. If the ratio r of concentration of inflow falls to the ratio r4 of concentration of inflow, control is performed to maintain the ratio at the ratio r4 of concentration of inflow. The amount of fall of the ratio r of concentration of inflow is not limited to this. It is also possible to make it fall to an amount by which the ammonia which is fed to the $NO_X$ selective reduction catalyst becomes insufficient.

If, at step 124, the amount I of adsorption of ammonia is the upper limit judgment value $ID_{high}$ of the amount of adsorption of ammonia or less, the routine proceeds to step 126.

At step 126, it is judged if the calculated amount I of adsorption of ammonia is smaller than the lower limit judgment value $ID_{low}$ of the amount of adsorption of ammonia. If, at step 126, the amount I of adsorption of ammonia is smaller than the lower limit judgment value $ID_{low}$, the routine proceeds to step 127.

At step 127, control is performed to make the ratio "r of concentration of inflow rise. In the present embodiment, the ratio is made to rise to the predetermined ratio r5 of concentration of inflow. If the ratio r of concentration of inflow rises to the ratio r5 of concentration of inflow, control is performed to maintain the ratio at the ratio r5 of concentration of inflow. The amount of rise of the ratio r of concentration of inflow is not limited to this. It is also possible to make it increase until the amount which is fed to the $NO_X$ selective reduction catalyst becomes excessive.

If, at step 126, the amount I of adsorption of ammonia is the lower limit judgment value $ID_{low}$ or more, the current control is ended.

In the internal combustion engine of the present embodiment as well, the $NO_X$ selective reduction catalyst can remove $NO_X$ and ammonia with high removal rates. The present embodiment detects the amount of adsorption of ammonia by the $NO_X$ selective reduction catalyst and uses the detected amount of adsorption as the basis for control for adjusting the inflow concentration ratio, but the invention is not limited to this. It is also possible to not estimate the amount of adsorption of ammonia at the $NO_X$ selective reduction catalyst. For example, every predetermined time interval, control where the ratio of concentration of inflow is maintained in a range larger than the reference ratio of concentration and control where the ratio of concentration of inflow is maintained in a range smaller than a reference ratio of concentration may be repeated.

The rest of the configuration, actions, and effects are similar to the Embodiment 1, so explanations will not be repeated here.

In the above control, the order of the steps can be suitably switched or a plurality of steps can be performed simultaneously. Further, the above embodiments may be suitably combined. In the above figures, the same or corresponding parts are assigned the same reference signs. Note that, the above embodiments are illustrative and do not limit the invention. The embodiments include changes within the scope of the claims.

The invention claimed is:

1. An internal combustion engine provided with
   an ammonia feeder which feeds ammonia to combustion chambers;
   an $NO_X$ selective reduction catalyst which is arranged in an engine exhaust passage and which selectively reduces $NO_X$ by a feed of a reducing agent comprised of ammonia, wherein
   the $NO_X$ selective reduction catalyst has a $NO_X$ removal rate and an ammonia removal rate which depend on a ratio of concentration of ammonia to $NO_X$ of an exhaust which flows into the $NO_X$ selective reduction catalyst, defined as a ratio of concentration of inflow, a high removal rate range of the ratio of concentration of inflow where the $NO_X$ removal rate in the $NO_X$ selective reduction catalyst becomes substantially maximum and, furthermore, the ammonia removal rate becomes substantially maximum is set in advance, and the internal combustion engine, using a controller, estimates the ratio of concentration of inflow and controls the ratio of concentration of inflow so that the ratio of concentration of inflow is maintained inside the high removal rate range;

a cracker which includes a catalyst which cracks ammonia to produce hydrogen; and a hydrogen feeder which feeds the hydrogen which was produced at the cracker to the combustion chambers, wherein, when making the ratio of concentration of inflow rise, a ratio of hydrogen to ammonia which are fed to the combustion chambers is maintained constant while making an air-fuel ratio at the time of combustion fall, and, when making the ratio of concentration of inflow fall, the ratio of hydrogen to ammonia which are fed to the combustion chambers is maintained constant while making the air-fuel ratio at the time of combustion rise.

2. The internal combustion engine as set forth in claim 1, wherein, when making the ratio of concentration of inflow rise, an ignition timing is advanced, while when making the ratio of concentration of inflow fall, the ignition timing is retarded.

3. The internal combustion engine as set forth in claim 1, wherein:

when making the ratio of concentration of inflow rise, a ratio of hydrogen to ammonia which are fed to the combustion chambers is made to fall, and, when making the ratio of concentration of inflow fall, the ratio of hydrogen to ammonia which are fed to the combustion chambers is made to rise.

4. The internal combustion engine as set forth in claim 3, further provided with an air feeder which feeds air to the cracker, wherein the catalyst of the cracker has the function of oxidizing ammonia and is formed so that ammonia and air are fed so that the ammonia is cracked and hydrogen is produced and so that the ammonia is oxidized and heat required for the cracking reaction is produced, and, when changing the ratio of hydrogen to ammonia which are fed to the combustion chambers, a ratio of air to ammonia which are fed to the cracker is made to change.

5. The internal combustion engine as set forth in claim 1, wherein at least one of a $NO_X$ concentration and an ammonia concentration of the exhaust which flows out from the $NO_X$ selective reduction catalyst is detected and the detected at least one concentration of the $NO_X$ concentration and the ammonia concentration is used as the basis to estimate the ratio of concentration of inflow.

6. An internal combustion engine provided with an ammonia feeder which feeds ammonia to combustion chambers;

an $NO_X$ selective reduction catalyst which is arranged in an engine exhaust passage and which selectively reduces $NO_X$ by a feed of a reducing agent comprised of ammonia, wherein the $NO_X$ selective reduction catalyst has an ability to adsorb ammonia, a $NO_X$ removal rate and an ammonia removal rate which depend on a ratio of concentration of ammonia to $NO_X$ of an exhaust which flows into the $NO_X$ selective reduction catalyst, defined as a ratio of concentration of inflow, the ratio of concentration of inflow when removing all of the $NO_X$ which flows into the $NO_X$ selective reduction catalyst, defined as a reference ratio of concentration, is set in advance, and a control where the ratio of concentration of inflow is maintained in a range larger than the reference ratio of concentration and a control where the ratio of concentration of inflow is maintained in a range smaller than the reference ratio of concentration are repeatedly performed; and wherein a high removal rate range of the ratio of concentration of inflow where the $NO_X$ removal rate in the $NO_X$ selective reduction catalyst becomes substantially maximum and, furthermore, where the ammonia removal rate becomes substantially maximum is set in advance, the control for maintaining the ratio in the range larger than the reference ratio of concentration includes a control for maintaining the ratio of concentration of inflow at a ratio of concentration higher than the high removal rate range, and the control for maintaining the ratio in the range smaller than the reference ratio of concentration includes a control for maintaining the ratio of concentration of inflow at a ratio of concentration lower than the high removal rate range.

7. The internal combustion engine as set forth in claim 6, wherein an amount of adsorption of ammonia at the $NO_X$ selective reduction catalyst is estimated, when the estimated amount of adsorption of ammonia is less than a predetermined lower limit judgment value, a control is performed to maintain the ratio of concentration of ammonia to $NO_X$ in a range larger than the reference ratio of concentration, and, when the estimated amount of adsorption of ammonia is larger than a predetermined upper limit judgment value, a control is performed to maintain the ratio of concentration of ammonia to $NO_X$ in a range smaller than the reference ratio of concentration.

8. The internal combustion engine as set forth in claim 6, wherein when making the ratio of concentration of inflow rise, an ignition timing is advanced, while when making the ratio of concentration of inflow fall, the ignition timing is retarded.

9. The internal combustion engine as set forth in claim 6, further provided with a cracker which includes a catalyst which cracks ammonia to produce hydrogen and a hydrogen feeder which feeds the hydrogen which was produced at the cracker to the combustion chambers, wherein, when making the ratio of concentration of inflow rise, a ratio of hydrogen to ammonia which are fed to the combustion chambers is maintained constant while making an air-fuel ratio at the time of combustion fall, and, when making the ratio of concentration of inflow fall, the ratio of hydrogen to ammonia which are fed to the combustion chambers is maintained constant while making the air-fuel ratio at the time of combustion rise.

10. The internal combustion engine as set forth in claim 6, further provided with a cracker which includes a catalyst which cracks ammonia to produce hydrogen and a hydrogen feeder which feeds the hydrogen which was produced at the cracker to the combustion chambers, wherein, when making the ratio of concentration of inflow rise, the ratio of hydrogen to ammonia which are fed to the combustion chambers is made to fall, and, when making the ratio of concentration of inflow fall, the ratio of hydrogen to ammonia which are fed to the combustion chambers is made to rise.

11. The internal combustion engine as set forth in claim 10, further provided with an air feeder which feeds air to the cracker, wherein the catalyst of the cracker has a function of oxidizing ammonia and is formed so that ammonia and air are fed so that the ammonia is cracked and hydrogen is produced and so that the ammonia is oxidized and the heat required for a cracking reaction is produced, and, when changing the ratio of hydrogen to ammonia which are fed to the combustion chambers, the ratio of air to ammonia which are fed to the cracker is made to change.

12. The internal combustion engine as set forth in claim 6, wherein at least one of a $NO_X$ concentration and an ammonia concentration of the exhaust which flows out from the $NO_X$ selective reduction catalyst is detected by a sensor, and the detected at least one concentration of the $NO_X$ concentration and the ammonia concentration is used as the basis to estimate the ratio of concentration of inflow.

* * * * *